United States Patent [19]

Blahut et al.

[11] 4,403,287
[45] Sep. 6, 1983

[54] MICROPROCESSOR ARCHITECTURE HAVING INTERNAL ACCESS MEANS

[75] Inventors: Donald E. Blahut, Holmdel; Jonathan A. Fields, Aberdeen; Victor K. Huang, Gillette; Charles M. Lee, New Providence; Masakazu Shoji, Warren, all of N.J.

[73] Assignee: Bell Telephone Laboratories, Incorporated, Murray Hill, N.J.

[21] Appl. No.: 295,857

[22] Filed: Aug. 24, 1981

[51] Int. Cl.³ .......................................... G06F 11/00
[52] U.S. Cl. ..................................... 364/200; 371/16
[58] Field of Search ........................ 364/200 MS File; 371/16, 20

[56] References Cited

U.S. PATENT DOCUMENTS

| | | | |
|---|---|---|---|
| 3,623,011 | 11/1971 | Baynard et al. | 364/200 |
| 3,898,621 | 8/1975 | Zelinski et al. | 364/200 |
| 4,074,851 | 2/1978 | Eichelberger et al. | 371/25 |
| 4,128,873 | 12/1978 | Lamiaux | 364/200 |
| 4,167,780 | 9/1979 | Hayashi | 364/200 |

OTHER PUBLICATIONS

*IEEE Trans. on Computers*, vol. C-22, Jan. 1973, M. J. Y. Williams and J. B. Angell, "Enhancing Testability of LSI Circuits Via Test Points and Additional Logic," pp. 46–60.

*J. Design Automation and Fault Tolerant Computing*, vol. 2, May 1978, E. B. Eichelberger and T. W. Williams, "A Logic Design Structure for LSI Testability," pp. 165–198.

*Primary Examiner*—Felix D. Gruber
*Assistant Examiner*—Stuart D. Dwork

*Attorney, Agent, or Firm*—Arthur J. Torsiglieri; David I. Caplan

[57] ABSTRACT

A single-chip processor architecture is disclosed which permits the registers and control latches of the processor to be easily accessed without using instructions to achieve such access. The architecture provides for an internal access (IA) function which is enabled by applying an IA Request signal to an $\overline{IA}$ terminal of the processor. During the IA function, program execution in the processor is suspended and the registers and control latches may be accessed as if they were storage locations in a random access memory. After the IA function is enabled, the address of a register or control latch selected for access is applied to the Address/Data port of the processor, and an IA Control Code specifying the strobing of the Address/Data port is applied to the Status terminals of the processor. After strobing of the address, a second IA Control Code specifying either reading or writing of the selected register or control latch is applied to the Status terminals. If the second Control Code specifies reading, the contents of the selected register or control latch is provided at the Address/Data port. If the second Control Code specifies writing, data received at the Address/Data port is stored in the selected register. The IA function facilitates program development in the processor because it provides an efficient means for observing the internal machine states and register contents of the processor. Functional testing of the processor is also facilitated because the IA function increases the availability of the internal nodes of the processor chip for the application of test signals and for the observation of circuit responses.

10 Claims, 25 Drawing Figures

FIG. 9
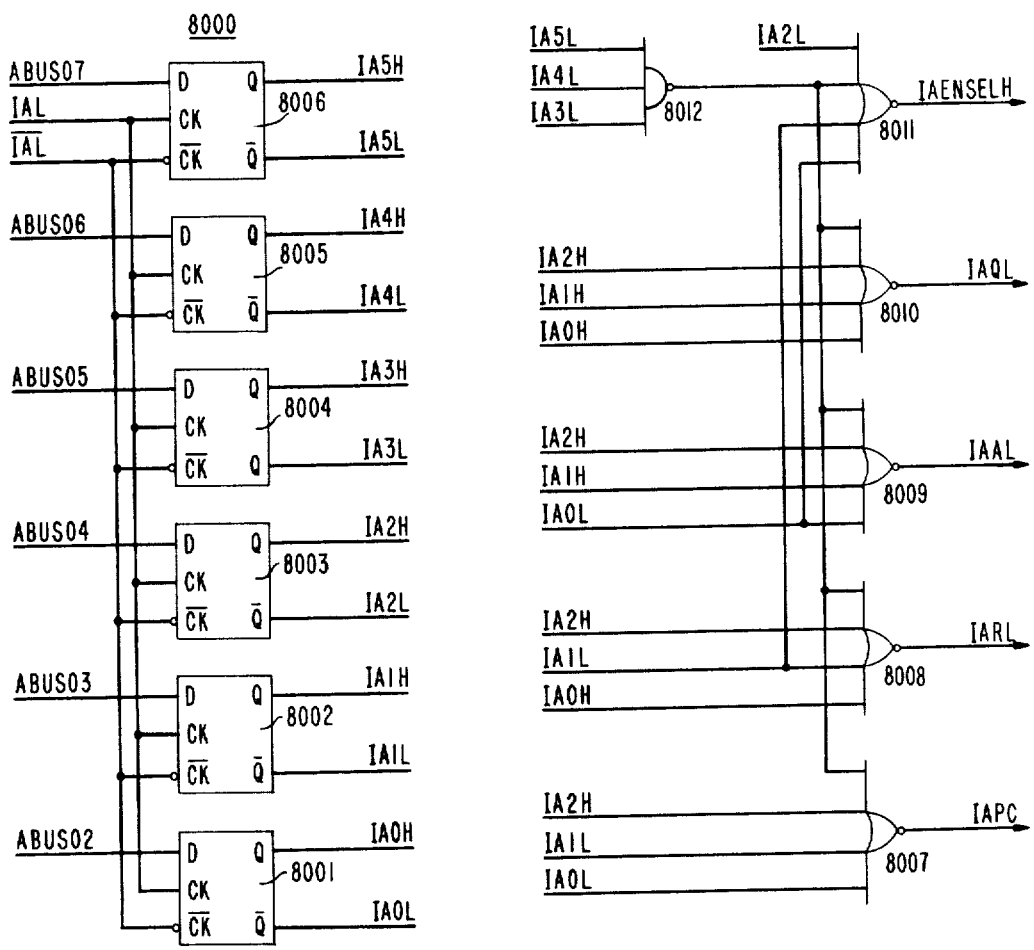
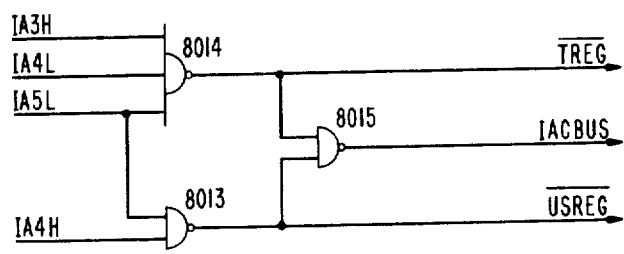

FIG. 10
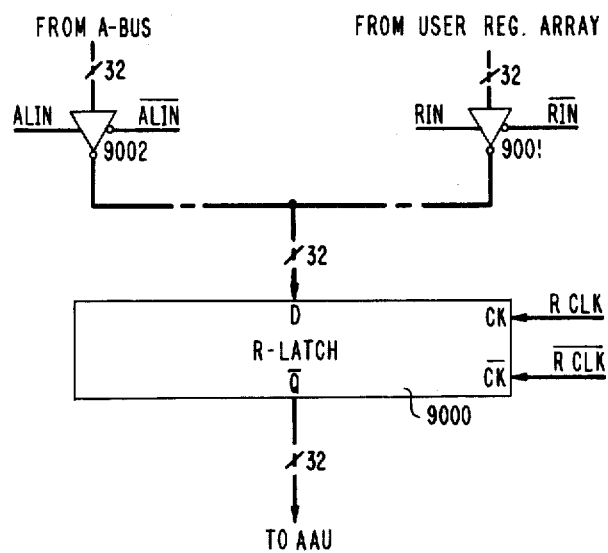
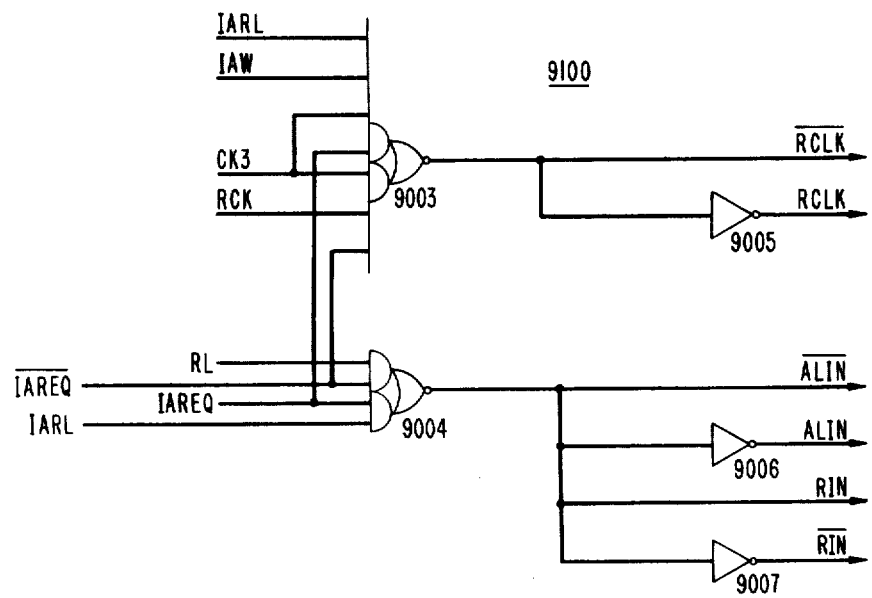

FIG. 11
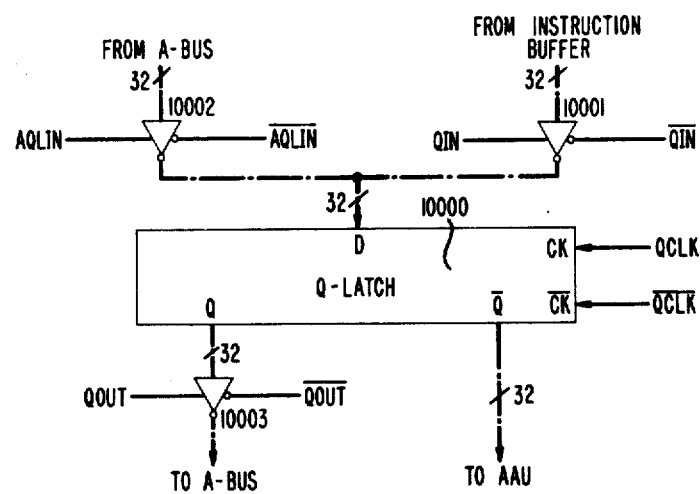
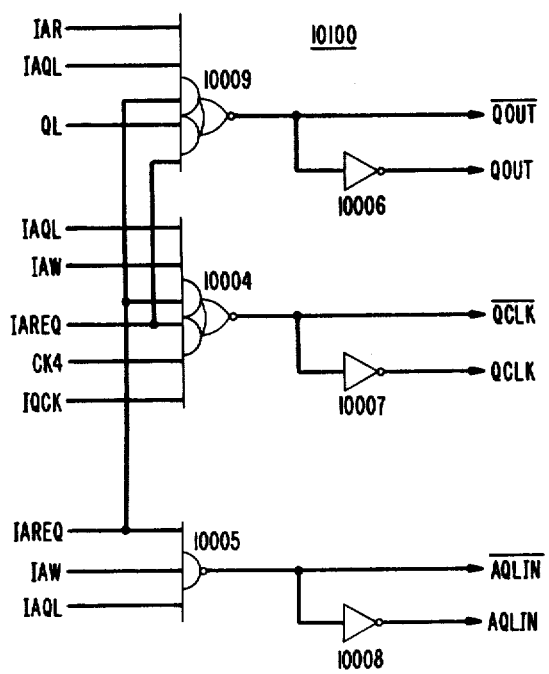

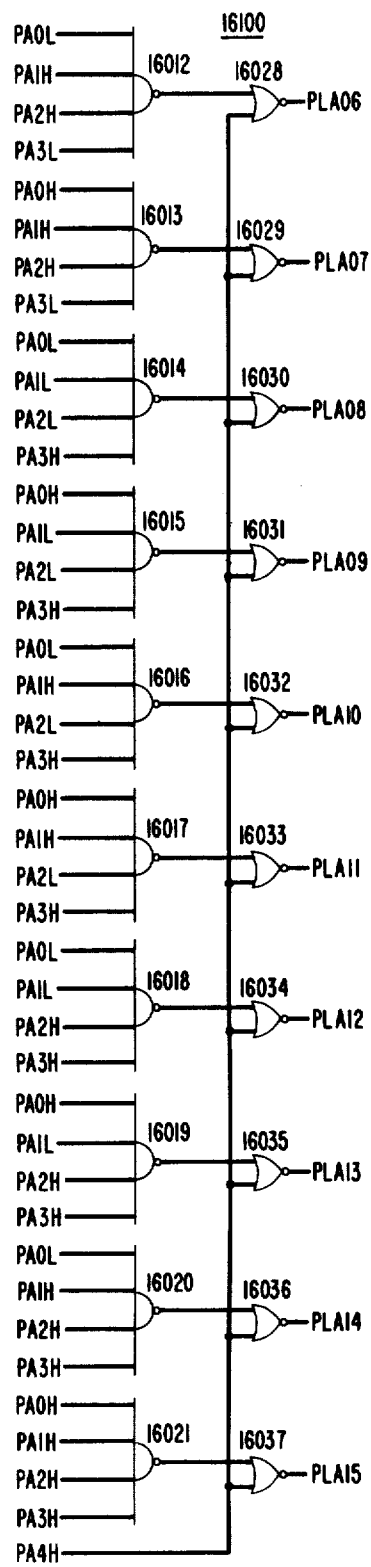
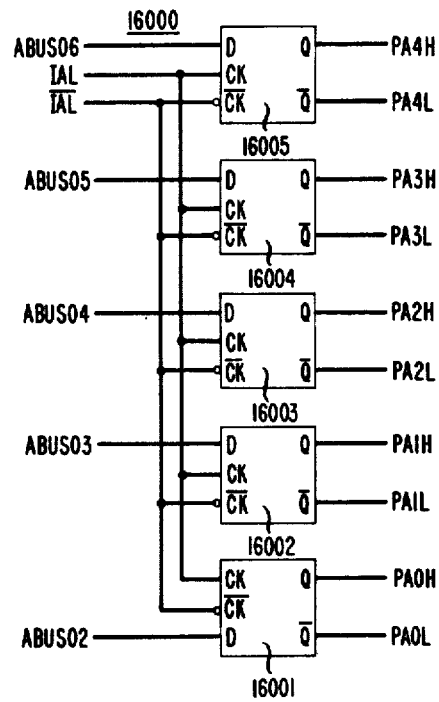
FIG. 17
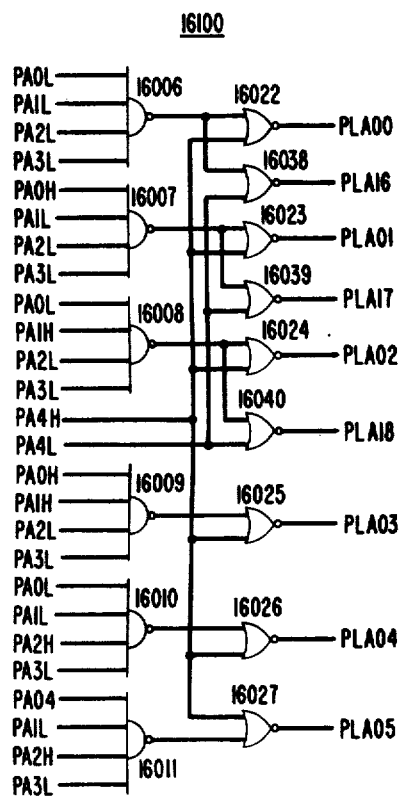

FIG. 20
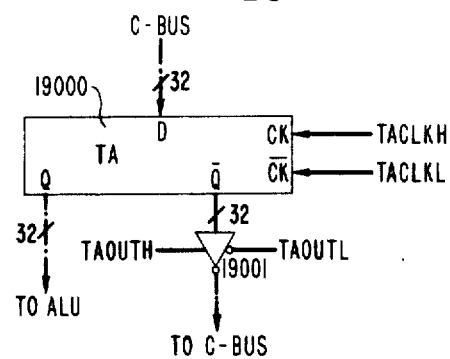
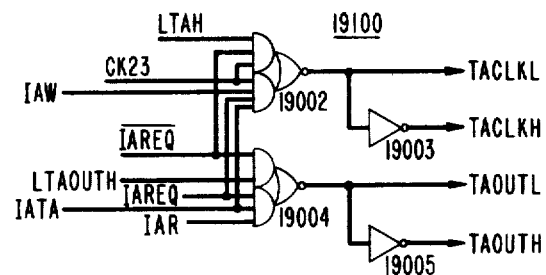
FIG. 21
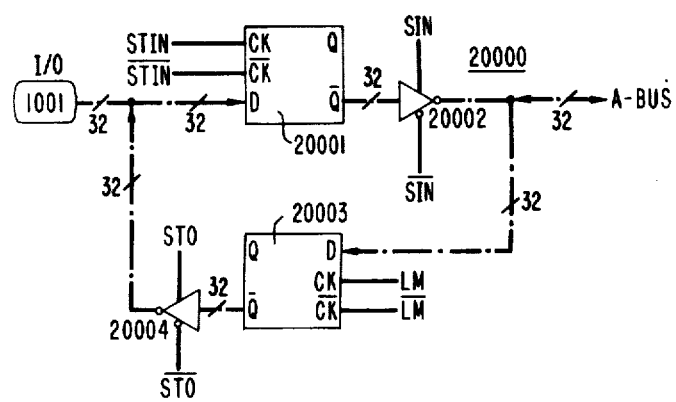

FIG. 22
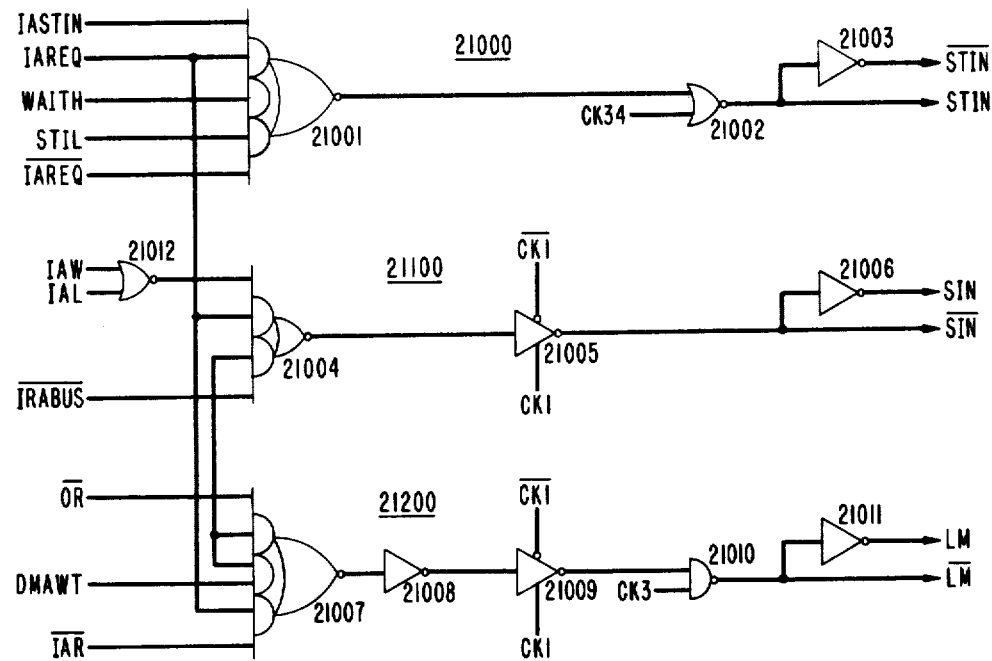
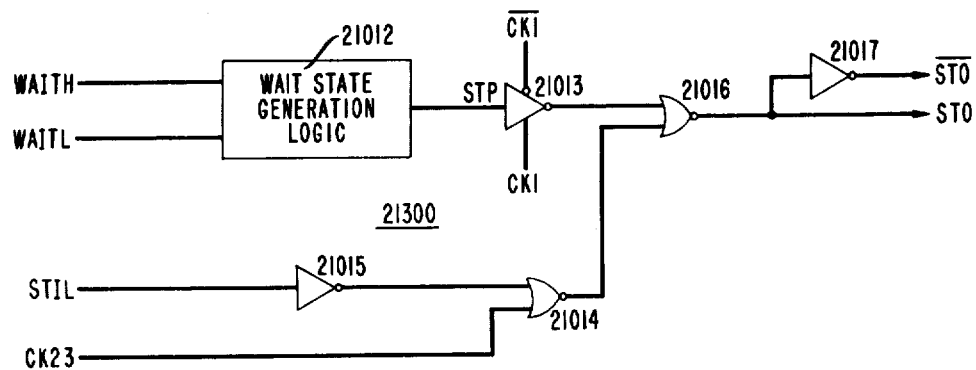

MICROPROCESSOR ARCHITECTURE HAVING INTERNAL ACCESS MEANS

BACKGROUND OF THE INVENTION

Integrated circuits capable of performing the functions of a processing unit of a digital computer are known in the art. Such circuits, termed microprocessors, are now widely used in a variety of relatively low-cost data processing applications, such as stored program controlled telephone equipment, data terminals, electric appliance controls, and home computers. Normally, microprocessors are combined with other components, such as memory circuits and input/output circuits, to form microcomputers. Some of the more recently developed microprocessors and microcomputers are fabricated entirely on a single integrated circuit chip.

In general, a microprocessor is designed to execute a sequence of instructions called a program and includes means for fetching instructions from a program store, an instruction register for storing a current instruction being executed, a plurality of internal registers for storing operands, addresses, and intermediate data, and a control unit for decoding the current instruction and providing control signals to govern the execution of a processor operation specified by the current instruction. Since most processor operations involve the reading and/or writing of certain internal registers, the control unit provides register control signals for controlling such reading and writing operations when required for the execution of the current instruction.

Recent advances in integrated circuit technology in the areas known as very-large-scale-integration (VSLI) have made feasible the design of single-chip microprocessors and microcomputers having more complex architectures than was previously possible. For example, such advances have made possible microprocessor architectures having wider and more numerous internal buses, "pipeline" arrangements which allow the overlapping of fetch and execute operations, and wider and more numerous internal registers. However, such increases in the architectural complexity of microprocessors impinge upon both the testing of and the development of programs in such microprocessors.

In general, program development in a microprocessor becomes more difficult as the complexity of the microprocessor increases. In order to detect and diagnose program "bugs" efficiently, a programmer should monitor and analyze the contents of the internal registers of the microprocessor during program execution. As the complexity of the microprocessor increases, the number of internal registers to be monitored by the programmer also increase. Furthermore, in prior art microprocessors the available means for monitoring the contents of internal registers are inconvenient and some internal registers cannot be directly monitored at all.

Typically, the internal registers of a microprocessor fall into two categories, namely a user and a nonuser category. The user category includes those internal registers which can be directly accessed (i.e., read and-/or written) through the execution of appropriate instructions, while the nonuser category includes those internal registers, such as the temporary data registers, temporary address registers, program counter and control latches, which cannot be directly accessed through instructions. Because in prior art microprocessors the only available means for observing the contents of internal registers is through the execution of appropriate instructions, only those registers in the user category are available for monitoring during program development, and such monitoring requires the insertion of appropriate additional instructions in predetermined locations in a program under development. Thus, microprocessors of the prior art have the problems of not permitting a programmer to directly observe the contents of registers in the nonuser category and inconveniently requires the programmer to alter the program under development by the insertion of additional instructions whenever monitoring of internal registers is desired at particular program locations. Therefore, from the standpoint of facilitating program development it would be advantageous to have a microprocessor architecture which would permit a programmer to monitor the contents of internal registers in both the user and nonuser categories without having to use program instructions for such monitoring.

Functional testing of a microprocessor also becomes more difficult as the complexity of the microprocessor increases. Because tests on an integrated circuit chip can only be made from the terminals (i.e., the bonding pads or package pins) of the chip, and because the internal conductors of the chip are, as a practical matter, not accessible for either the application of test signals or the observation of circuit responses, therefore, the individual functional components of a microprocessor, such as the control unit, the arithmetic unit, etc., cannot be tested independently but only as part of signal paths between input and output terminals. Consequently, not all of the potential logical faults in the various functional components are detectable using tests made only from the terminals of the chip. The number of undetectable logical faults tend to increase as the complexity of the microprocessor increases.

Functional testing of a digital integrated circuit chip is typically performed by applying a sequence of binary logic signals called test vectors to the input terminals of a chip being tested and by observing the response signals called output vectors at the output terminals of the chip. Logical faults in the chip are detected by comparing the observed output vectors with those which would be expected from a properly functioning chip, a disagreement in the comparison indicating the existence of one or more logical faults in the chip. Both the application of the test vectors and the comparison of the output vectors are typically performed by automatic test equipment.

A test vector sequence is normally designed to minimize the number of logical faults which are undetectable in a functional test while using the shortest possible sequence. The undetectable faults are undesirable since chips having such faults would pass the functional test. An excessively lengthy test vector sequence is also undesirable since such a sequence would require a long testing time and therefore lead to a high testing cost. A figure of merit for a test vector sequence, commonly referred to as the fault coverage, is the percentage of all potential logical faults of the chip being tested which are detectable in a functional test using that test vector sequence. In general, the maximum achievable fault coverage for a test vector sequence for functional testing of a prior art microprocessor is less than one hundred percent and decreases as the complexity of the microprocessor increases. Moreover, the length of a test vector sequence required to achieve maximum fault coverage increases as the complexity of the microprocessor being tested increases.

It is known that the maximum achievable fault coverage in the functional testing of a microprocessor can be increased and the length of the test vector sequence for achieving maximum fault coverage can be decreased by increasing the access to the internal circuit nodes of the microprocessor for the purpose of applying of test signals and of detecting circuit responses. Access to many of the internal circuit nodes of a microprocessor can be achieved by providing direct access to the internal registers of the microprocessor. However, to derive optimal testing benefits from such access, the means which are used to provide access to the internal registers must not themselves introduce a significant number of undetectable logical faults. Therefore, such means should be simple and should be largely independent of the other functional components of the microprocessor, particularly the control unit. Therefore, such means should not be under the control of microprocessor instruction.

In a copending United States patent application having Ser. No. 61,741, entitled "Microprocessor Architecture for Improved Chip Testability" and filed on July 30, 1979 in the name of M. Shoji, a co-inventor in the present application, it was disclosed that a substantial number of the undetectable logical faults in a microprocessor are situated in the control unit and that a significant improvement in the functional testing of a microprocessor can be achieved by making the control signals from the control unit directly observable at the terminals of the microprocessor chip. According to the Shoji application, observability of the control signals is achieved by providing the microprocessor with means for directly coupling the control lines of the microprocessor to its terminals. However, where the control unit of the microprocessor includes control latches for storing the control signals, observability of the control signals may also be achieved by providing means for directly reading the control latches.

In view of the above-discussed problems in functional testing and in program development, a need clearly exists for a microprocessor architecture which provides random access to the internal registers of the microprocessor including the control latches by independent means which are not under the control of instructions.

SUMMARY OF THE INVENTION

The present invention is a single chip processor for executing a sequence of instructions, the processor comprising means for receiving instructions, a plurality of internal registers, and control means responsive to a current instruction for providing control signals governing the execution of a processor operation specified by the current instruction, including register control signals for governing the reading and/or writing of the internal registers. The processor is characterized in that the internal registers include ones which are assigned test addresses and are addressable thereby, and there are included means for receiving a test command signal, means responsive to the test command signal for providing a test enable signal, and means responsive to the test enable signal for suspending the execution of instructions. Furthermore, there are included means for receiving test addresses, means for storing a current test address specifying an internal register, means for receiving test control codes specifying reading or writing of the specified internal register, and means for storing a current test control code. In addition there are included test control means responsive to the current test control code for providing test control signals for governing the reading or writing of the specified internal register, and test address decoding means being responsive to the current test address for providing a selection signal corresponding to the specified internal register. There are further included control signal multiplexer means receiving the register control signals and the test control signals and responsive to the selection signal for providing appropriate ones of the test control signals to the specified internal register, means for receiving data to be stored in the specified internal register when writing is specified by the current test control codes and means for providing data from the specified internal register when reading is specified by the current test control code.

BRIEF DESCRIPTION OF THE DRAWINGS

FIG. 9 is a logic diagram of preferred embodiments of the IA A-BUS Latch and the Temporary A-BUS Register Address Decoder;

FIG. 10 is a logic diagram of one of the Temporary A-BUS Registers (R-latch), and a preferred embodiment of its associated Control Multiplexers;

FIG. 11 is a logic diagram of another one of the Temporary A-BUS Registers (Q-latch), and a preferred embodiment of its Control Multiplexers;

FIG. 17 is a logic diagram of preferred embodiments of the IA Control Latch Address Latch and the Control Latch Address Decoder;

FIG. 20 is a logic diagram of one of the Temporary C-BUS Registers (TA) and a preferred embodiment of its associated Control Multiplexers;

FIG. 21 is a logic diagram of the I/O Buffers;

FIG. 22 is a logic diagram of a preferred embodiment of the I/O Buffer Control Multiplexers;

DETAILED DESCRIPTION

Figure 1:
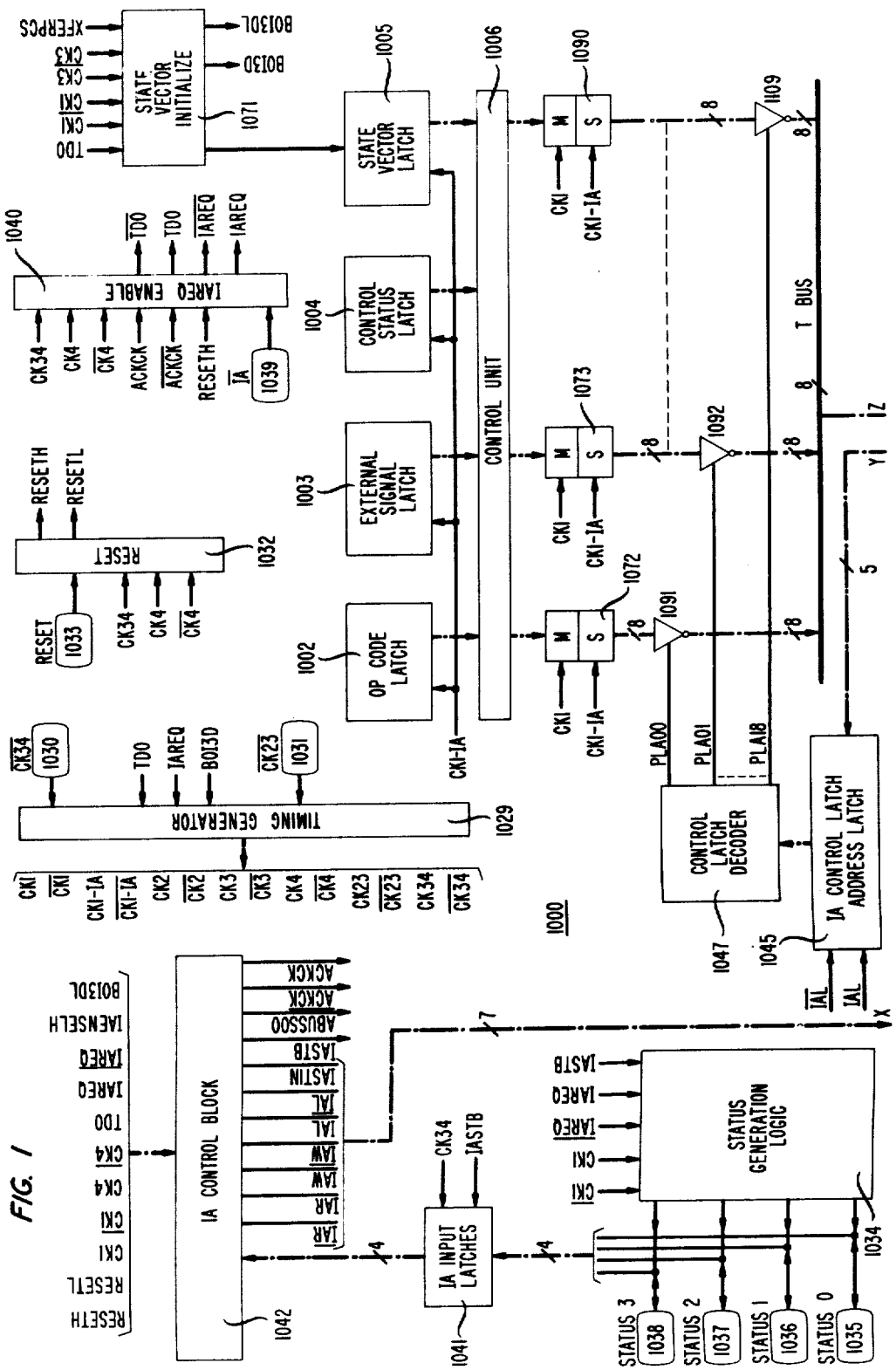
FIGS. 1 and 2 form a block diagram of a processor unit according to a preferred embodiment of the present invention, the relative positions of FIGS. 1 and 2 being shown in FIG. 25.
Figure 2:
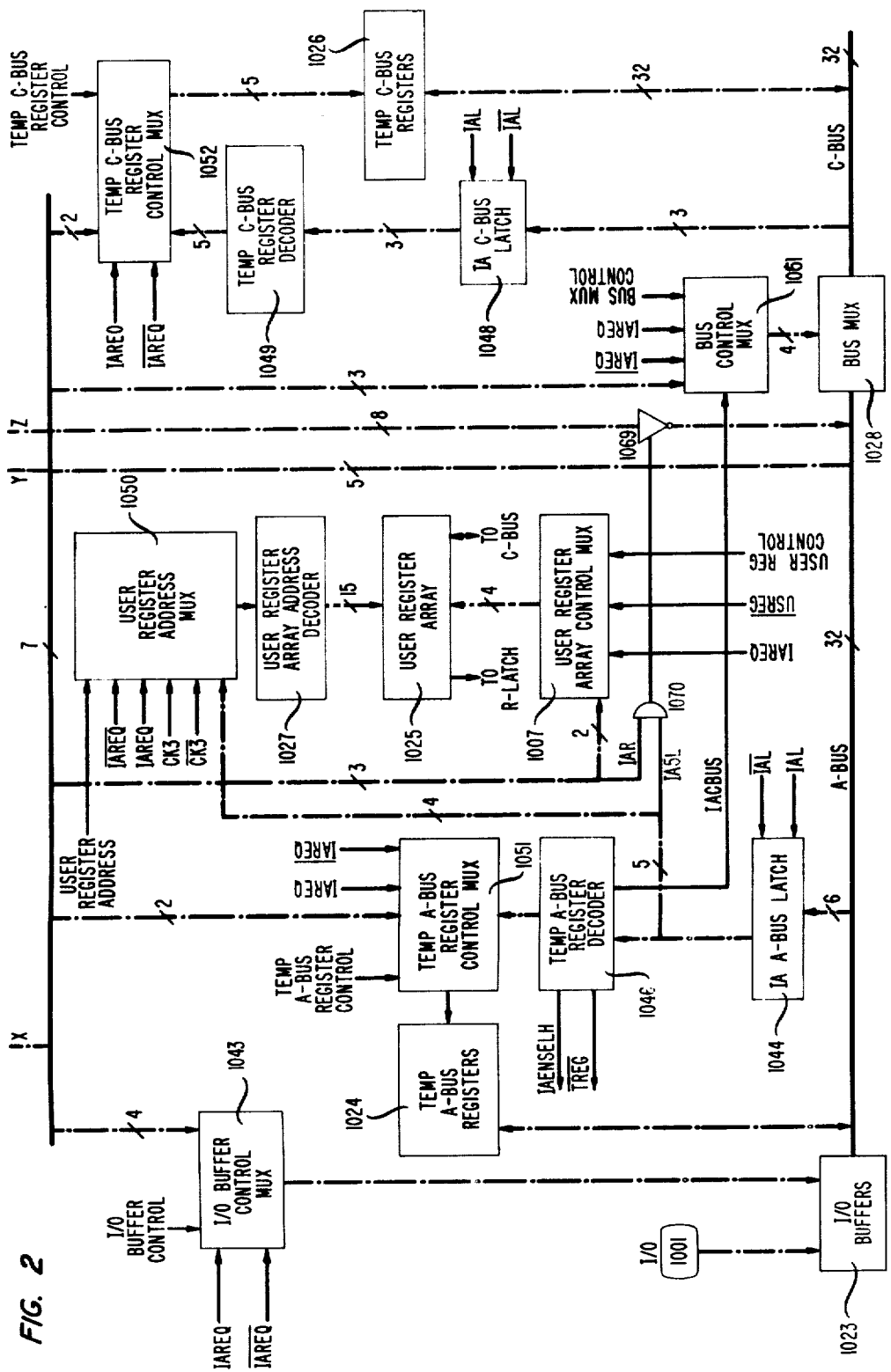
Figure 25:
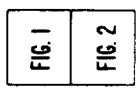
FIG. 25 illustrates the relative positions of FIGS. 1 and 2.

Referring now to FIGS. 1 and 2 there is shown a block diagram of a processor unit 1000 (FIG. 1) according to a preferred embodiment of the present invention. The relative positions of FIGS. 1 and 2 in the block diagram are shown in FIG. 25. Only those functional components of the processor unit which are needed to explain the invention are depicted in FIGS. 1 and 2. For simplicity the other functional components such as Arithmetic Logic Unit and the Address Arithmetic Unit which are necessary to form a complete processing unit have been omitted from the drawing. The processor unit is designed to execute a sequence of instructions which are received at the Input/Output (I/O) terminals 1001 (FIG. 2). In general, an instruction consists of an op-code which specifies a processor operation to be performed by the processor unit and an operand descriptor which specifies the operands, if any, to be used for the processor operation. The operand descriptor typically includes an address mode code specifying one of several modes for fetching operands. The operand descriptor also includes either operand address data or, in the case of the immediate data mode, one or more actual operands. The op-code and the address mode code of an instruction which is currently being executed by the processor unit are stored in an Op-code Latch 1002 (FIG. 1) of a Control Unit 1006. The main function of the Control Unit is to decode the contents of the Op-code Latch and to provide control signals governing the execution of the processor operation specified by the op-code of the current instruction, including the fetching of operands required for that processor operation. The Control Unit also receives the contents of a Control Status Latch 1004, an External Signal Latch 1003, and a State Vector Latch 1005. The Control Status Latch contains the status flags of the processing unit, while the External Signal Latch contains those externally received signals, such as the INTERRUPT, RESET, DIRECT MEMORY ACCESS REQUEST, and EXTERNAL FAULT, which modify normal program execution. The State Vector Latch contains the feedback signals from the Control Unit which determine the next state of the Control Unit. The control signals from the Control Unit are stored in nineteen byte-width Control Latches 1072 to 1090 (not all are shown), the control signals being distributed from the Control Latches to the various functional components of the processing unit along control lines which are not shown.

The processing unit has two separate 32-bit buses, designated the A-BUS and the C-BUS, which communicate through a BUS Multiplexer (MUX) 1028 (FIG. 2). During normal operation of the processor unit, the operation of the BUS Multiplexer 1028 is governed by BUS Multiplexer Control signals from the Control Unit. The use of separate buses permits arithmetic and logic operations to take place on the C-BUS simultaneously with operand fetch or instruction fetch operations on the A-BUS. The A-BUS is coupled to the I/O Buffers 1023 which during normal operation are governed by I/O Buffer Control signals from the Control Unit.

The registers of the processor unit fall into three groups, namely the Temporary A-BUS Registers 1024, the User Register Array 1025, and the Temporary C-BUS Registers 1026. The Temporary A-BUS Registers include a Q-latch and a R-latch for storing data to be used for operand address formation, an Address Latch for storing the address of the next operand to be fetched and a Program Counter for storing the address of the next instruction to be fetched. During normal operation, the reading and writing operations of the Temporary A-BUS Registers 1024 are governed by the Temporary A-BUS Register Control signals 1052 from the Control Unit.

The User Register Array 1025 includes fifteen 32-bit registers used for local storage of frequency used data and addresses. The array is implemented with a 15×32 bit Random Access Memory (RAM) having its own User Register Array Address Decoder 1027 which during normal operation decodes User Register Array Address signals provided by an Instruction Buffer (not shown in FIGS. 1 and 2) to select a register in the Array specified by the Address signals. During normal operation the reading or writing of the selected register is governed by User Register Control signals provided by the Control Unit. The User Register Array is coupled to provide data to and to receive data from the C-BUS and also to provide data directly to the R-Latch.

The Temporary C-BUS Registers 1026 include five 32-bit registers for storing operands and intermediate data for arithmetic and logic operations. The reading and writing of these registers during normal operation are governed by Temporary C-BUS Register Control signals provided by the Control Unit. The four groups of registers 1024, 1025, 1026 and the Control Latch 1072 to 1090 comprise the internal registers of the processor unit.

Figure 3:
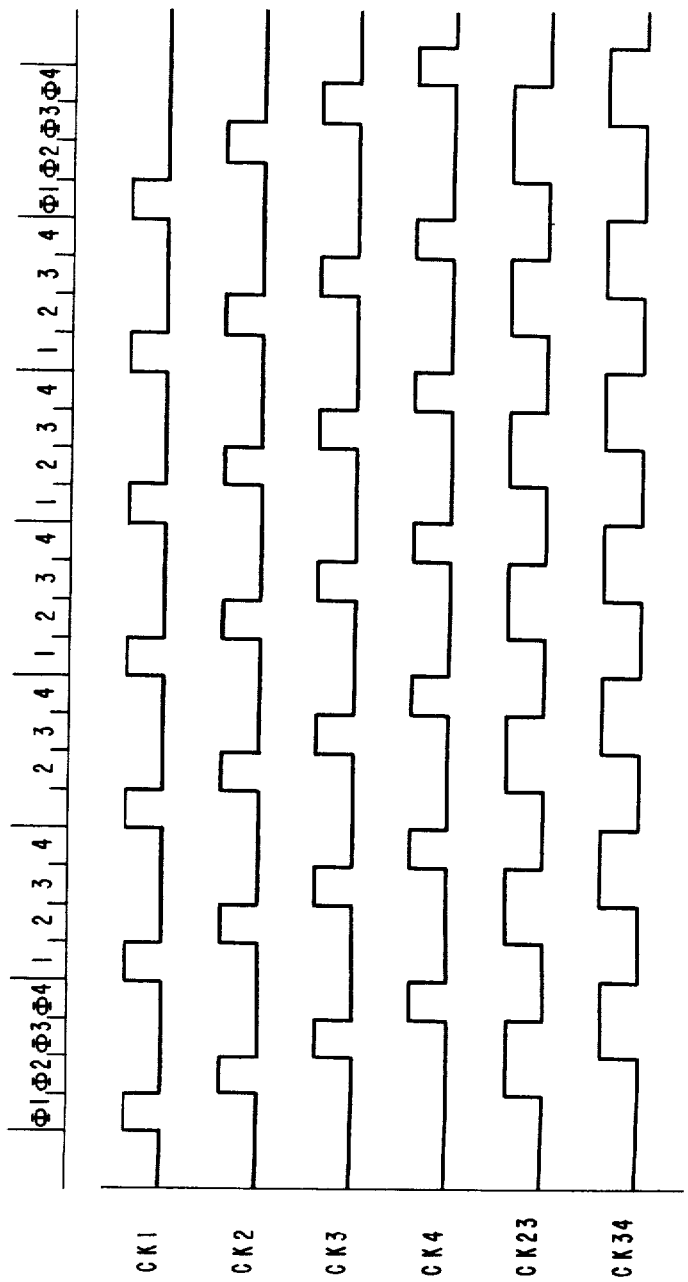
FIG. 3 is a timing diagram illustrating the timing signals of the processor unit.

The timing signals for the processor unit are provided by the Timing Generator 1029 which receives external clock signals $\overline{CK34}$ and $\overline{CK23}$ at respective terminals 1030 and 1031 and provides internal clock signals CK1, CK2, CK3, CK4, CK23, CK34, and CK1-IA and their respective complements $\overline{CK1}$, $\overline{CK2}$, $\overline{CK3}$, $\overline{CK4}$, $\overline{CK23}$, $\overline{CK34}$, and $\overline{CK1\text{-}IA}$. The relationship of the timing signals CK1 to CK4, CK23 and CK34 is illustrated in FIG. 3. The timing signals CK1 through CK4 mark the four phases $\phi1$ through $\phi4$ of a machine cycle of the processor unit. An instruction cycle for the processor unit may have from 2 to 391 machine cycles depending on the instruction being executed. Timing signal CK23 overlaps $\phi2$ and $\phi3$ while timing signal CK34 overlaps $\phi3$ and $\phi4$. The signals CK1-IA and $\overline{CK1\text{-}IA}$ will be explained below, in connection with the Internal Access function of the processor unit.

Referring again to FIGS. 1 and 2, a Reset circuit 1032 receives an externally provided RESET signal at terminal 1033 and provides an appropriately timed internal reset signal RESETH and its complement RESETL.

The Status Generation Logic 1034 (FIG. 1) provides a 4-bit Status Code on the STATUS0 to STATUS3 terminals 1035 to 1038. The Status Code provides information concerning the type of memory access operation, such as instruction fetch, operand fetch, address fetch, memory write and no operation which is to take place during the next machine cycle.

During normal operation of the processor unit only the registers of the User Register Array 1025 (FIG. 2) are directly accessible for reading and writing from the I/O terminals 1001. Such access is achieved through appropriate instructions and must, therefore, involve those functional components in the instruction execution path, such as the Op-code Latch 1002, the Control Unit 1006, the Control Latches 1072 to 1090, the Temporary A-BUS Registers 1024, and the Address Arithmetic Unit (not shown in FIGS. 1 and 2). However, the processor unit of FIGS. 1 and 2 is provided with a special function called Internal Access in which the internal registers of the processor unit may be randomly accessed for reading and/or writing from the I/O terminals without involving the functional components of the instruction execution path.

The Internal Access (IA) function is enabled by the application of a logic "0" level $\overline{IA}$ signal to the $\overline{IA}$ terminal 1039 (FIG. 1). A logic "0" level signal will hereafter be referred to as "0". The IA signal is sampled by an IA Request Enable circuit 1040 at the beginning of $\phi 3$ following its application. There are available in the processor unit two modes for the IA function, namely a Diagnostic Mode and Instruction Mode. In the Diagnostic Mode the IA function starts at the beginning of $\phi 1$ following the sampling of a "0" $\overline{IA}$ signal. In the Instruction Mode, the IA function starts at the beginning of the second machine cycle of the instruction cycle following the one in which the IA signal is sampled. The selection of the IA mode will be explained below.

At the start of the IA function, the IA Reguest Enable circuit 1040 provides a IAREQ signal and its complement $\overline{IAREQ}$. The IAREQ signal enables the IA circuitry and causes the Timing Generator 1029 to inhibit the CK1-IA and $\overline{CK1}$-IA clock signals which control the Input Latches 1002 to 1005 to the Control Unit 1006, the slave sections (designated by S) of the Control Latches 1072 to 1090, and the precharge circuitry of the Arithmetic Logic Unit (not shown in FIGS. 1 and 2), and the Address Arithmetic Unit (not shown in FIGS. 1 and 2). Thus, during the IA function, all unit signals to the Control Unit and all control signals provided by the Control Unit are "frozen", and all arithmetic logic operation and address computations are halted. In this manner the normal operation of the processor unit is suspended.

In addition, the IAREQ signal causes the Status Generation Logic 1034 to provide an IA Acknowledge Status Code on the Status terminals 1035 to 1038 indicating the start of the IA function. At the beginning of $\phi 4$ following the apperance of the IA Acknowledge Status Code, the outputs of the Status Generation Logic go to a high impedance state, and the Status Terminals 1035 to 1038 become input terminals for IA Control Codes. By using the Status terminals as both output terminals for the status codes and as input terminals for the IA Control Codes, the number of additional terminals needed for implementation of the IA function is reduced.

During the IA function, the Status terminals are sampled at the beginning of $\phi 4$ of each machine cycle by IA Input Latches 1041. The contents of the IA Input Latches are decoded by an IA Control Block 1042 to provide IA control signals IAR, IAW, IAL, IASTIN, IASTB and their complements $\overline{IAR}$ $\overline{IAW}$ and $\overline{IAL}$. The IA Control Codes and their corresponding functions are listed in Table I.

TABLE I

| IA Control Codes | |
|---|---|
| Function | Hex Code |
| ADDRESS STROBE | 5, |
| READ | 6, |
| WRITE | 7. |

Each of internal registers of the processor unit which is to be accessible during IA function is assigned an IA Address. The registers of the User Register Array which have already been assigned addresses for reference by an instruction are assigned the same addresses for the IA function. A list of the internal registers of the processor unit, their assigned IA Addresses, and their operation during the IA function is provided in Table II.

TABLE II

| INTERNAL ACCESS ADDRESSES | | |
|---|---|---|
| INTERNAL REGISTER | IA ADDRESS | IA FUNCTION |
| QLATCH (Temp. A-BUS Regs.) | 0x00000000 | Read, Write |
| ADDRESS LATCH | 0x00000004 | Read |
| RLATCH | 0x00000008 | Write |
| PROGRAM COUNTER | 0x0000000C | Write |
| IAEN FLIP FLOP | 0x0000001C | Read, Write |
| TA (Temp. C-BUS Regs.) | 0x00000020 | Read, Write |
| TB | 0x00000024 | Read, Write |
| TC | 0x00000028 | Read |
| TE | 0x0000002C | Write |
| TF | 0x00000030 | Read, Write |
| UR00 (User Regs.) | 0x00000040 | Read, Write |
| UR0L | 0x00000044 | Read, Write |
| UR02 | 0x00000048 | Read, Write |
| UR03 | 0x0000004C | Read, Write |
| UR04 | 0x00000050 | Read, Write |
| UR05 | 0x00000054 | Read, Write |
| UR06 | 0x00000058 | Read, Write |
| UR07 | 0x0000005C | Read, Write |
| UR08 | 0x00000060 | Read, Write |
| UR09 | 0x00000064 | Read, Write |
| UR10 | 0x00000068 | Read, Write |
| UR11 | 0x0000006C | Read, Write |
| UR12 | 0x00000070 | Read, Write |
| UR13 | 0x00000074 | Read, Write |
| UR14 | 0x00000078 | Read, Write |
| PLA00 (Control Latches) | 0x00000080 | Read |
| PLA01 | 0x00000084 | Read |
| PLA02 | 0x00000088 | Read |
| PLA03 | 0x0000008C | Read |
| PLA04 | 0x00000090 | Read |
| PLA05 | 0x00000094 | Read |
| PLA06 | 0x00000098 | Read |
| PLA07 | 0x0000009C | Read |
| PLA08 | 0x000000A0 | Read |
| PLA09 | 0x000000A4 | Read |
| PLA10 | 0x000000A8 | Read |
| PLA11 | 0x000000AC | Read |
| PLA12 | 0x000000B0 | Read |
| PLA13 | 0x000000B4 | Read |
| PLA14 | 0x000000B8 | Read |
| PLA15 | 0x000000BC | Read |
| PLA16 | 0x000000C0 | Read |
| PLA17 | 0x000000C4 | Read |
| PLA18 | 0x000000C8 | Read |

After the start of the IA function a 6-bit IA Address specifying an internal register to be accessed is applied to six of the I/O terminals 1001, and an IA Control Code specifying ADDRESS STROBE is applied to the Status terminals 1035 to 1038. The ADDRESS STROBE IA Control Code is then decoded by the IA Control Block 1042 to provide corresponding IA Control signals IASTIN, IAL and $\overline{IAL}$. I/O Buffer Control Multiplexers (MUX) 1043 provide appropriate IA control signals to control the I/O Buffers during the IA function. Thus, the IASTIN signal causes the I/O Buffers to strobe the IA Address at the I/O terminals, while the IAL signal causes the current IA Address in the I/O Buffers to be transferred via the A-BUS to the IA A-BUS Address Latch 1044. The contents of the IA A-BUS Address Latch are decoded by a Temporary A-BUS Register Decoder 1046. If the current IA Address selects one of the Temporary A-BUS Registers, corresponding selection signals are provided to a Temporary A-BUS Register Control Multiplexer 1051 causing an appropriate IA control signal (IAR or IAW) to be provided to the selected register. During normal operation, the Temporary A-BUS Register Control Multiplexers provide the Temporary A-BUS Register Control signals to the Temporary A-BUS Registers.

If the current IA Address selects one of the Temporary C-BUS Registers 1026, the Temporary A-BUS Register Decoder provides an IACBUS signal to BUS Control Multiplexer 1061 causing the three most significant bits of the current IA Address on the A-BUS to be transferred via the BUS Multiplexer 1028 and the C-BUS to a IA C-BUS Address Latch 1048. During the IA function the BUS Control Multiplexer 1061 provides appropriate IA control signals and the IACBUS signal to govern the operation of the BUS Multiplexer 1028. However, during normal operation, the BUS Control Multiplexer provides the BUS Multiplexer Control signals from the Control Unit to govern the operation of the BUS Multiplexer.

The contents of the IA C-BUS Latch are decoded by a temporary C-BUS Register Decoder 1049 which provides corresponding selection signals to Temporary C-BUS Register Control Multiplexers 1052 which in turn provides an appropriate IA Control signal (IAR or IAW) to the selected register of the Temporary C-BUS register 1026. During normal operation the Temporary C-BUS Registers Control Multiplexer 1052 provides the Temporary C-BUS Register Control signals to govern the Temporary C-BUS Registers 1026.

The least significant four bits of the current IA Address are also provided to User Register Address Multiplexers 1050. During the IA function, the User Register Address Multiplexers provide those bits to a User Register Address Decoder 1027, but during normal operation, the User Register Address Multiplexers provide the User Register Address signals from the Instruction Buffer (not shown) to the User Register Decoder. If during the IA function the current IA Address specifies one of the User Registers, the User Register Address Decoder provides a selection signal corresponding to the selected register to the User Register Array 1025.

During the IA function, User Register Array Control Multiplexers 1007 provide an appropriate IA control signal (IAR or IAW) to the User Register Array, but during normal operation, the User Register Array Control Multiplexer provides the User Register Control signals.

The five least significant bits of the current IA Address are also provided to an IA Control Latch Address Latch 1045, the contents of which are decoded by a Control Latch Decoder 1047. If the current IA Address selects one of the Control Latches 1072 to 1090, the Control Latch Address Decoder provides a corresponding selection signal to enable one of nineteen groups of Tri-state Inverters 1091 to 1109 associated with the selected Control Latch.

Following the application of the ADDRESS STROBE IA Control Code, a second IA Control Code specifying either a read or a write operation is applied to the Status terminals 1035 to 1038. The second Control Code is strobed into the IA Input Latches 1041 and decoded by the IA Control Block 1042. If the second IA Control Code specifies a read operation, the IA Control Block provides the IAR signal and its complement $\overline{IAR}$ to cause the contents of the selected internal register to be transferred via the A-BUS and the I/O Buffers to the I/O terminals.

If the selected register is one of the Temporary A-BUS Registers, its contents are transferred directly to the A-BUS. If the selected register is one in the User Register Array or one of the Temporary C-BUS Registers, its contents are first transferred to the C-BUS and is then transferred to the A-BUS via the BUS Multiplexer, the IAR and IACBUS signals causing data on the C-BUS to be transferred to the A-BUS. If the selected register is one of the Control Latches, its contents are first transferred through its associated group of Tri-state Inverters to a T-BUS. The data on the T-BUS is then transferred to the A-BUS through eight Tri-state Inverters 1069 which are controlled by the output of a 2-input AND gate 1070. The AND gate receives the IAR signal and the fifth bit, IA5L, of the current IA Address.

If the second IA control code specifies a write operation, input data to be written into the selected internal register must be applied to the I/O terminals. The IA Control Block first provides the IASTIN signal to cause the input data on the I/O terminals to be strobed into the I/O Buffers. The IA Control Block then provides the IAW signal and its complement $\overline{IAW}$ to cause the current input data in the I/O Buffers to be transferred to the selected register.

If the selected register is one of the Temporary A-BUS Registers, the input data is transferred directly from the A-BUS to the selected register. If the selected register is in the User Register Array or is one of the Temporary C-BUS Registers, the input data is transferred to the C-BUS via the BUS Multiplexer.

The IA function in the processor unit is terminated by the removal of the "0" IA signal. The removal of the IA signal is sampled at the beginning of $\phi3$ and terminates the IAREQ and $\overline{IAREQ}$ signals at the beginning of the following $\phi1$. Termination of the IAREQ and $\overline{IAREQ}$ signals disables all of the IA circuitry and restores the CK1-IA and $\overline{CK1-IA}$ clock signals to allow the processor unit to resume its normal operation. If the terminated IA function was performed in the Instruction Mode, the processing unit resumes normal operation by fetching and executing the next instruction, the State Vector Latch 1005 having been initialized to the first state of a new instruction cycle by a State Vector Initialize Circuit 1071.

If the terminated IA function was performed in the Diagnostic Mode, the State Vector Latch is not initialized and the processor unit attempts to resume normal operation from where it left off when IA function was started. However, if data which is essential to an operation being performed by the processor unit prior to the IA function is lost during the IA function, that operation cannot be successfully resumed after termination of the IA function. In that case the processor unit must be restarted. If the Program Counter is written during the IA function, it must be restored with the address of the next instruction before termination of the IA function.

Figure 4:
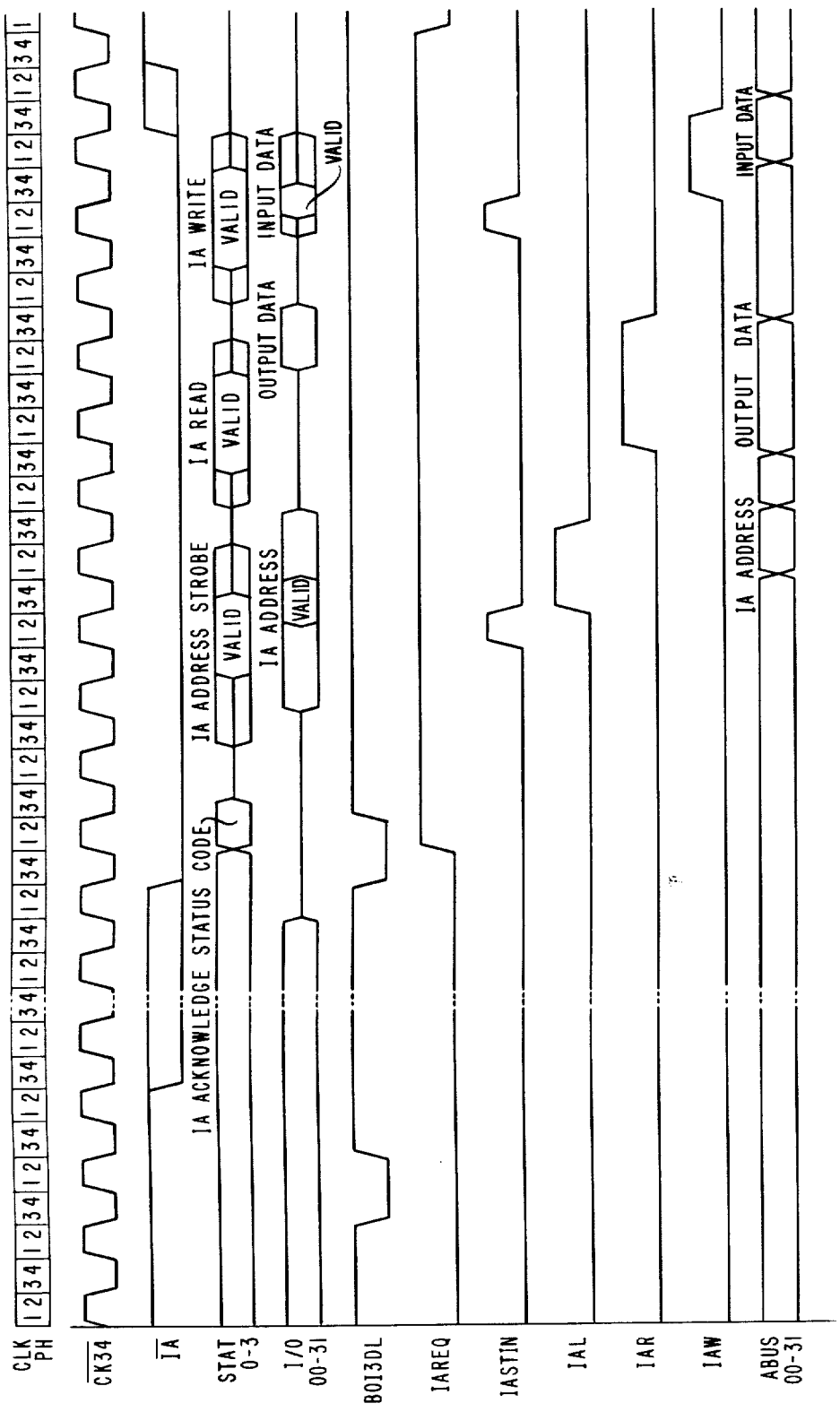
FIG. 4 is a timing diagram illustrating the principal signals of the IA function.

Referring now to FIG. 4, there is shown a timing diagram of the principal signals related to the IA function. Shown in FIG. 4 are the external signals on the $\overline{CK34}$, $\overline{IA}$, STATUS, and I/O terminals of the processor unit, the internal signals BO13DL, IAREQ, IASTIN, IAL, IAR, IAW, and the signals on the A-BUS. As discussed above, the IA function is enabled when the external $\overline{IA}$ signal makes a logic "1" to logic "0" (1-0) transition. The $\overline{IA}$ signal is sampled at the beginning of $\phi 3$, and depending upon whether the Diagnostic Mode or the Instruction Mode has been selected, the IA function starts at the beginning of the next machine cycle after sampling or at the beginning of the second machine cycle of the next instruction cycle, respectively. FIG. 4 illustrates the IA function in the Instruction Mode. Therefore, the IAREQ signal which controls the start of the IA function makes a logic "0" to logic "1" (0—1) transition at the beginning of $\phi 1$ of the second machine cycle of the instruction cycle following the one in which the IA function is enabled. The beginning of an instruction cycle is indicated by the BO13DL signal which makes a 1—0 transition at the beginning of $\phi 3$ of the first machine cycle of a new instruction cycle and remains at "0" for four clock phases. The logic "1" level IAREQ signal causes the IA Acknowledge Code to appear at STATUS terminals for three clock phases after which the STATUS terminals become input terminals for the IA Control Codes. The logic "1" level will hereafter be referred to as "1". The ADDRESS STROBE Control Code may be applied to the STATUS terminals at any time after a minimum waiting period of three clock phases after the termination of the IA Acknowledge Status Code but must remain valid for a minimum period of five clock phases. The ADDRESS STROBE IA Control Code is sampled at the beginning of $\phi 3$ to cause a 0-1 transition of the IASTIN signal after a delay of two clock phases and a similar transition of the IAL signal after a delay of four clock phases. The IA Address for selecting an internal register to the access may be applied to the I/O terminals at any time after the start of the IA function but must be valid no later than three clock phase after the ADDRESS STROBE Control Code is valid. The IA Address which must remain valid for at least three clock phases is strobed into the Input Buffers by the 0-1 transition of IASTIN and is thereafter transferred to the A-BUS at the beginning of $\phi 1$ following the 0-1 transition of IAL. While the IAL signal is a "1", the various IA Address Latches are enabled to receive the IA Address. The IAL signal returns to a "0" at the beginning of $\phi 4$ following the removal of the ADDRESS STROBE Control Code from the STATUS terminals, at which time the IA Address Latches are disabled. The IA Address in the various IA Address Latches specifies the internal register being accessed until a new IA Address is transferred to the IA Address Latches.

A READ Control Code may be applied to the STATUS terminals at any time after a minimum waiting period of two clock phases following the removal of the previous IA Control Code and must remain valid for at least six clock phases. Upon being sampled at the beginning of $\phi 3$, the READ IA Control Code causes the IAR signal to go to a "1" at the beginning of the next $\phi 4$. The 0-1 transition of IAR causes the data stored in the selected internal register to be transferred to the A-BUS. This data appears at the I/O terminals five clock phases after the 0-1 transition of IAR. The IAR signal returns to a "0" at the beginning of $\phi 4$ following the removal of the READ Control Code, and the output data on the I/O terminals remain valid for one clock phase thereafter.

A WRITE Control Code may be applied to the STATUS terminals at any time after a minimum waiting period of two clock phases following the removal of the previous IA Control Code and must remain valid for at least six clock phases. Upon being sampled at the beginning of $\phi 3$, the WRITE IA Control Code causes both the IASTIN and IAW signals to go to a "1" after respective delays of two and four clock phases. The input data which is to be stored in the selected internal register is applied to the I/O terminals and must be valid no later than three clock phases after the WRITE IA Control code is valid. The input data is strobed into the I/O buffers by the 0-1 transition of IASTIN and is subsequently transferred to the A-BUS at the beginning of $\phi 1$ after IAW goes to a "1". The IAW signal returns to a "0" at the beginning of $\phi 4$ following the removal of the WRITE IA Control Code, at which time the WRITE function is completed.

The IA function is terminated when the $\overline{IA}$ signal is brought to a "1". Upon being sampled at the beginning of $\phi 3$, the "1" level of $\overline{IA}$ causes IAREQ to return to a "0" at the beginning of the following $\phi 1$, at which time all IA circuitry are disabled and the processor unit returns to normal operation.

Figure 5:
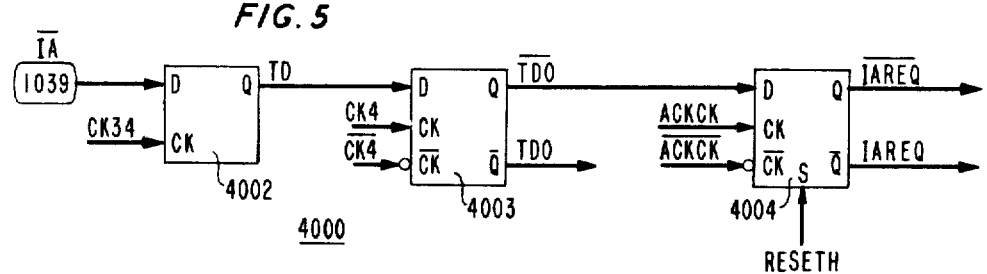
FIG. 5 is a logic diagram of a preferred embodiment of the IA Request Enable Circuit.

Turning now to FIG. 5, there is shown a logic diagram of a preferred embodiment of the $\overline{IA}$ Request Enable circuit 4000. The $\overline{IA}$ signal received at the IA terminal 1039 is clocked by CK34 into a first D-type flip-flop 4002 to provide a TD signal. The TD signal is clocked by CK4 and $\overline{CK4}$ into a second D-type flip-flop 4003 to provide a TDO signal and its complement $\overline{TDO}$. The TDO signal is clocked by an ACKCK signal and its complement $\overline{ACKCK}$ into a third D-type flip-flop 4004 which provides the IAREQ and $\overline{IAREQ}$ signals. The ACKCK and $\overline{ACKCK}$ signals are provided by the IA Control Block. The IAREQ signal can be forced to a "0" by a RESETH signal from the RESET circuit.

Figure 6:
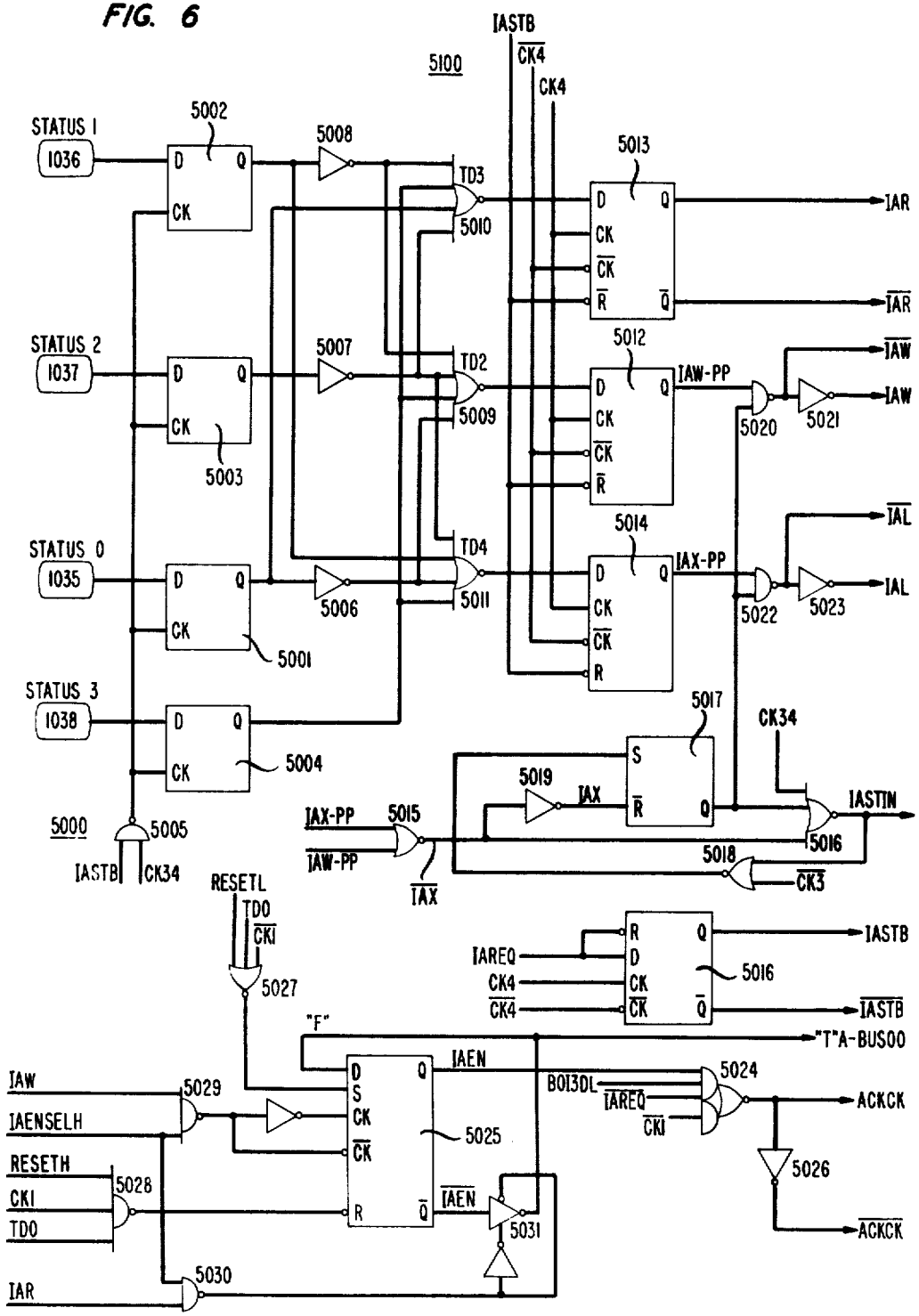
FIG. 6 is a logic diagram of a preferred embodiment of the IA Input Latches and the IA Control Block.

Referring now to FIG. 6, there is shown a logic diagram of a preferred embodiment of the IA Input Latches 5000 and the IA Control Block 5100. The IA Input Latches comprise four D-type latches 5001 to 5004 which are respectively coupled to the STATUS terminals 1035 to 1038. The latches are clocked by the output of a NAND gate 5005 which receives CK34 and an IASTB signal. The IASTB signal is provided by a D-type flip-flop 5016 which receives IAREQ and is clocked by CK4, and $\overline{CK4}$. The flip-flop has an inverted reset input which also receives IAREQ.

The contents of the latches 5001 to 5004 are decoded by a circuit comprising three Inverters 5006 to 5008 and three 4-input NOR gates 5009 to 5011, respectively, providing TD2, TD3 and TD4 signals. These signals are respectively clocked into D-type flip-flops 5012 to 5014 by CK4 and $\overline{CK4}$. The flip-flops 5012 to 5014 provide IAW-PP, IAR (and $\overline{IAR}$) and IAX-PP signals, respectively. The IASTIN signal is provided by a NOR gate 5016 which receives CK34, the output of a S-R flip-flop 5017, and the output of a NOR gate 5015 receiving IAX-PP and IAW-PP. The flip-flop 5017 has a set input coupled to the output of a NOR gate 5018 which receives IASTIN and $\overline{CK3}$, and an inverted reset input coupled to the output of an Inverter 5019, which receives the output of NOR gate 5015.

The IAW signal is provided by a NAND gate 5020 which receives IAW-PP and the output of flip-flop 5017. The IAW signal is derived from $\overline{\text{IAW}}$ by an Inverter 5021. Similarly, the IAL signal is derived from IAX-PP and the output of flip-flop 5017 by a NAND gate 5022, and the IAL signal is derived from $\overline{\text{IAL}}$ by an inverter 5023. The IAR, IAW, IAL, and IASTIN signals are all forced to "0" when IASTB goes to a "0".

The ACKCK signal is provided by a 3-1 AND-OR-Invert (AOI) gate 5024 in which one of the AND gates receives BOI3DL, IAREQ and the output of an $\overline{\text{IAEN}}$ flip-flop 5025, and the other AND gate receives $\overline{\text{CK1}}$. The state of the IAEN flip-flop determines whether the IA functions is performed in the Diagnostic Mode or the Instruction Mode. If the IAEN flip-flop is in the "1" state, the IA function is performed in the Instruction Mode, and ACKCK goes to a "1" when BO13DL and $\overline{\text{CK1}}$ are both at "1" levels. However, if the IAEN flip-flop is in the "0" state, the IA function is performed in the Diagnostic Mode, and ACKCK goes to a "1" whenever $\overline{\text{CK1}}$ goes to a "1". The $\overline{\text{ACKCK}}$ signal is derived from ACKCK by an Inverter 5026.

The IAEN flip-flop has a set input coupled to the output of NOR gate 5027 which receives TDO, $\overline{\text{CK1}}$ and RESETL. The IAEN signal is forced to a "1" when all three signals received by the NOR gate 5027 are at "0" levels. Ordinarily, the IAEN flip-flop is set by applying a "1" signal on the RESET terminal of the processor unit for at least two machine cycles while a "1" signal is applied to the $\overline{\text{IA}}$ terminal.

The IAEN flip-flop has a reset input coupled to the output of a NAND gate 5028 which receives TDO, CK1 and RESETH. The IAEN signal is forced to a "0" when all three signals received by the NAND gate 5028 are at "1" levels. Ordinarily, the IAEN flip-flop is reset by applying a "1" signal to the RESET terminal for a minimum duration of two machine cycles while a "0" signal is being applied to the $\overline{\text{IA}}$ terminal.

The IAEN flip-flop has been assigned an address and may be read or written during the IA function as one of the internal registers of the processor unit. When the IA Address assigned to the IAEN flip-flop is decoded by the Temporary A-BUS Register Decoder, a "1" level IAENSELH selection signal is provided to enable NAND gates 5029 and 5030. Thereafter, if an READ IA Control Code is applied to the STATUS terminals, a "1" level IAR signal is provided to the NAND gate 5030 causing the output of this IAEN flip-flop to be transferred through a Tri-state Inverter 5031 to the least significant conductor A-BUS00 of the A-BUS. If the WRITE IA Control Code is applied after the IAEN flip-flop is selected, a "1" level IAW signal is provided to the NAND gate 5029 causing the data on the A-BUS00 conductor of the A-BUS to be clocked into the IAEN flip-flop.

Figure 7:
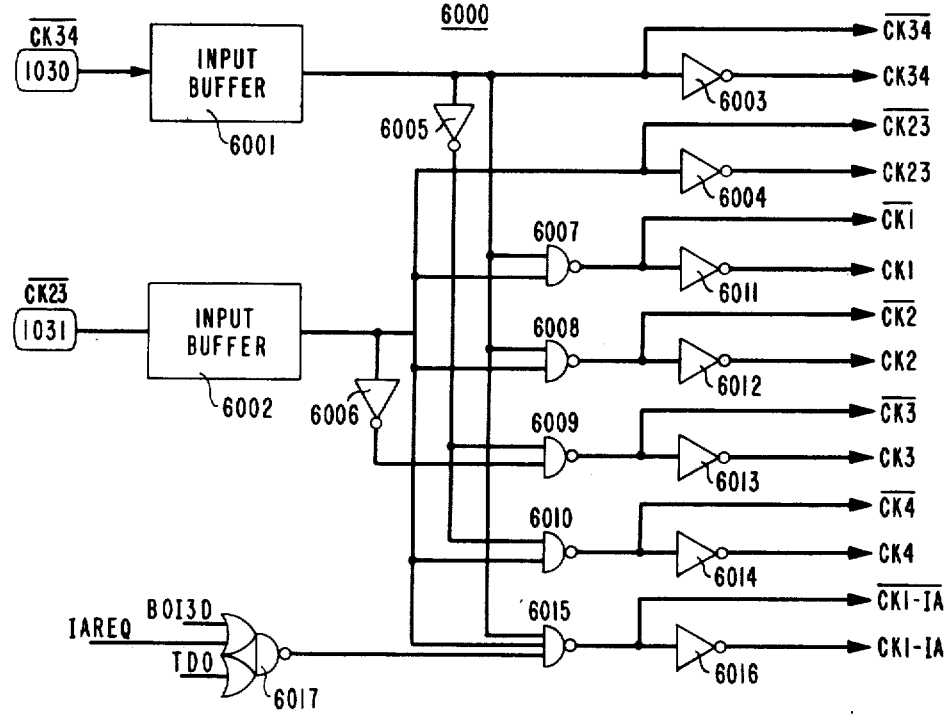
FIG. 7 is a logic diagram of a preferred embodiment of the Timing Generator.

Referring now to FIG. 7 there is shown a logic diagram of a preferred embodiment of the Timing Generator 6000. The Timing Generator receives external clock signals $\overline{\text{CK34}}$ and $\overline{\text{CK23}}$ at respective terminals 1030 and 1031 and through respective Input Buffers 6001 and 6002 and provides CK34, CK23, CK1 to CK4 and their complements $\overline{\text{CK34}}$, $\overline{\text{CK23}}$, $\overline{\text{CK1}}$ to $\overline{\text{CK4}}$. The CK34 and CK23 signals are derived from the outputs of the input buffers by Inverters 6003 and 6004, respectively. The $\overline{\text{CK1}}$ to $\overline{\text{CK4}}$ signals are derived from CK34, CK23 and their complements by NAND gates 6007 to 6010, respectively. The complements of $\overline{\text{CK1}}$ to $\overline{\text{CK4}}$ are provided by Inverters 6011 to 6014, respectively.

The Timing Generator also provides the CK1-IA signal and its complement $\overline{\text{CK1-IA}}$. During normal operation CK1-IA and $\overline{\text{CK1-IA}}$ are respectively the same as CK1 and $\overline{\text{CK1}}$, but during the IA function CK1-IA and $\overline{\text{CK1-IA}}$ are forced to a "0" and a "1", respectively. The CK1-IA signal is provided by a NAND gate 6015 which receives $\overline{\text{CK34}}$, $\overline{\text{CK23}}$ and the output of a 2-1 OR-AND-Invert (OAI) gate 6017 in which one of the OR gates receives a BOI3D signal (the complement of BOI3DL) and IAREQ and the other OR gate receives TDO. During normal operation when TDO is a "0", the OAI gate provides a "1" signal to enable the NAND gate 6015. However, during the IA function when TDO is a "1", the OAI gate provides a "0" signal to disable the NAND gate 6015 when either BOI3D or IAREQ is a "1". Thus, the output of the NAND gate 6015 is forced to a "1" and the output of the Inverter 6016 is forced to a "0".

Figure 8:
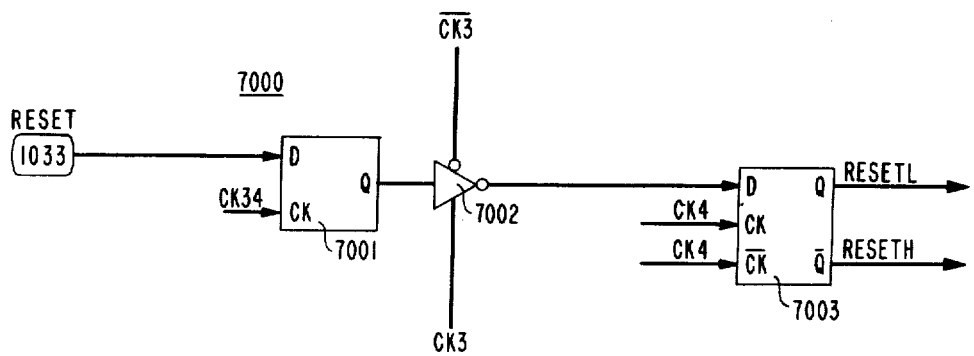
FIG. 8 is a logic diagram of the Reset circuit.

Turning now to FIG. 8, there is shown a logic diagram of a preferred embodiment of the RESET circuit 7000 which receives an externally applied RESET signal at terminal 1033 and provides a RESETH signal and its complement RESETL. The RESET signal is clocked into a D-type latch 7001 by CK34. The output of the latch is provided to the input of a Tri-state Inverter 7002 controlled by CK3 and $\overline{\text{CK3}}$. The Tri-state Inverter, which is used as a dynamic latch, is enabled when CK3 is a "1" to provide its output to the input of a D-type flip-flop 7003. The D-type flip-flop, which is clocked by CK4 and $\overline{\text{CK4}}$, provides the RESTL and RESETH signals.

Referring now to FIG. 9, there is shown a logic diagram of a preferred embodiment of the IA A-BUS Address Latch 8000 and the Temporary A-BUS Register Decoder 8100. The IA A-BUS Address Latch comprises six D-type flip-flops 8001 to 8006 each receiving data from one of the A-BUS conductors A-BUS02 to BUS07. The flip-flops are all clocked by the IAL and $\overline{\text{IAL}}$ signals. The Temporary A-BUS Register Decoder, which comprises NOR gates 8007 to 8011 and NAND gates 8012 to 8015, receives the normal and inverted output signals from the IA A-Bus Address Latch and provides selections signals IAPC, IARL, IAAL, IAQL and IAENSELH corresponding to the Program Counter, The R-Latch, the Address Latch, the Q-Latch and the IAEN flip-flop, respectively. In addition, the IA A-BUS Register Decoder also provides the TREG signal for enabling the Temporary C-BUS Register Decoder, the IACBUS signal for controlling the transfer of an IA Address from the A-BUS to the C-BUS, and the USREG signal for enabling the USER Register Control Multiplexer.

Referring now to FIG. 10, there is shown a logic diagram of the R-Latch 9000 and of a preferred embodiment of the Control Multiplexer 9100 associated with the R-Latch. The R-Latch is a 32-bit D-type register which is clocked by a RCLK signal and its complement $\overline{\text{RCLK}}$. During normal operation, the R-Latch receives data from the User Register Array through Tri-state Inverters 9001 and provides data to the AAU. The Tri-state Inverters 9001 are controlled by a RIN signal and its complement $\overline{\text{RIN}}$. During the IA function, the R-Latch may be written with data from the A-BUS received through Tri-state Inverters 9002 which are controlled by an ALIN signal and its complement $\overline{\text{ALIN}}$. The Control Multiplexers associated with the R-Latch comprise a 4-3 AOI gate 9003 which provides the $\overline{\text{RCLK}}$ signal, a 2—2 AOI gate 9004 which provides the $\overline{\text{ALIN}}$ (RIN) signal, and Inverters 9005, 9006 and 9007 which provide the RCLK, ALIN and $\overline{\text{RIN}}$ signals, respectively. One of the AND gates of the AOI gate 9003 receives IARL, IAW, CK3, and IAREQ while the other AND gate receives $\overline{\text{IAREQ}}$, CK3 and a write control signal RCK provided by the Control Unit. During normal operation, when IAREQ is a "0" and $\overline{\text{IAREQ}}$ is a "1", RCLK goes to a "1" to clock the R-Latch when CK3 and RCK are both at "1" levels. However, during the IA function, when IAREQ is a "1" and $\overline{\text{IAREQ}}$ is a "0", RCLK goes to a "1" when CK3, IARL, and IAW are all at "1" levels. One of the AND gates of the 2—2 AOI gate 9004 receives IAREQ and a selection signal RL provided by the Control Unit while the other AND gate receives $\overline{\text{IAREQ}}$ and IARL. During Normal operation, ALIN and $\overline{\text{RIN}}$ both follow RL. However, during the IA function, ALIN and $\overline{\text{RIN}}$ both follow IARL.

Referring now to FIG. 11 there is shown a logic diagram of the Q-Latch 10000 and of a preferred embodiment of the Control Multiplexers 10100 associated with the Q-Latch. The Q-Latch is clocked by a QCLK signal and its complement $\overline{\text{QCLK}}$. During normal operation, the Q-Latch receives data from the Instruction Buffer through Tri-state Inverters 10001 and provides data directly to the AAU. The Tri-state Inverters 10001 are controlled by a QIN signal and its complement $\overline{\text{QIN}}$. During the IA function, the Q-Latch may receive data from the A-BUS through Tri-state Inverters 10002 and may provide data to the A-BUS through Tri-state Inverters 10003. The Tri-state Inverters 10002 are controlled by a AQLIN signal and its complement $\overline{\text{AQLIN}}$, and the Tri-state Inverters 10003 are controlled by a QOUT signal and its complement $\overline{\text{QOUT}}$.

The Control Multiplexers associated with the Q-Latch include a 3-2 AOI gate 10009 providing a $\overline{\text{QOUT}}$ signal, a 3—3 AOI gate 10004 providing a $\overline{\text{QCLK}}$ signal, and a 3-input NAND gate 1005 providing a $\overline{\text{AQLIN}}$ signal. Also included are Inverters 10006, 10007, and 10008 providing QOUT, QCLK, and AQLIN signals, respectively. The AOI gate 10009 has one AND gate receiving IAR, IAQL and IAREQ and the other AND gate receiving a QL read control signal from the Control Unit and $\overline{\text{IAREQ}}$. During normal operation the Tri-state inverters 10003 are enabled to transfer data to the A-BUS by a "1" level QOUT signal when the QL signal goes to a "1". During the IA function QOUT goes to a "1" when IAQL and IAR are both at the "1" level.

The AOI gate 10004 has one AND gate receiving IAW, IAQL and IAREQ and the other AND gate receiving a IQCK write control signal from the Control Unit, CK4 and $\overline{\text{IAREQ}}$. During normal operation the data is clocked into the Q-Latch by a "1" QCLK signal when IQCLK and CK4 are both at "1" levels. During the IA function, the QCLK signal goes to a "1" when IAW and IAQL are both at "1" levels.

The NAND gate 10005 receives IAREQ, IAW, and IAQL. During normal operation, the NAND gate provides a "0" level AQLIN to disable the Tri-state Inverters 10002, but during the IA function, the NAND gate provides a "1" level AQLIN to enable the Tri-state Inverters 1002 when IAW and IAQL are both at "1" levels.

Figure 12:
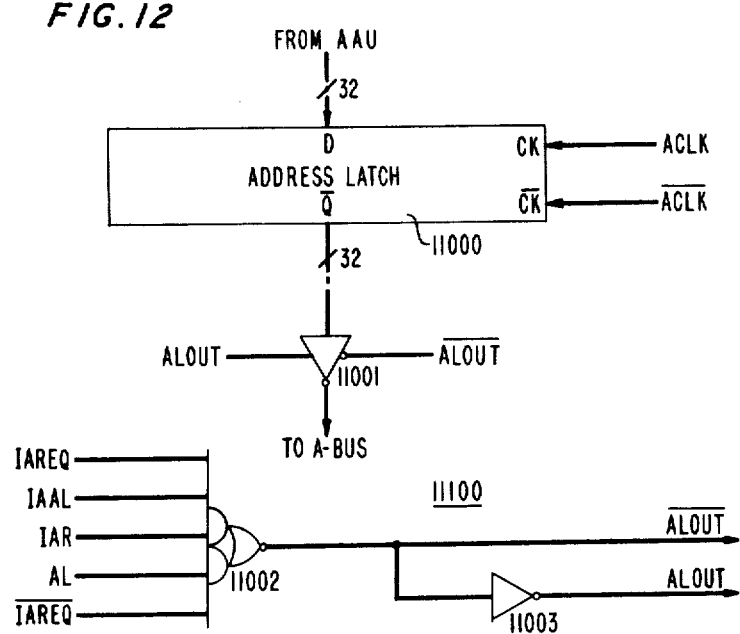
FIG. 12 is a logic diagram of another one of the Temporary A-BUS Registers (Address Latch), and a preferred embodiment of its associated Control Multiplexers.

Turning now to FIG. 12, there is shown a logic diagram of the Address Latch 11000 and a preferred embodiment of its associated Control Multiplexers 11100. During normal operation, the Address Latch receives data from the AAU and provides data to the A-BUS through Tri-state Inverters 11001 controlled by an ALOUT signal and its complement $\overline{\text{ALOUT}}$. During the IA function, the Address Latch may provide data to the A-BUS through tri-state inverters 11001. Data is clocked into the Address Latch by an ACLK signal and its complement $\overline{\text{ACLK}}$.

The Control Multiplexers associated with the Address Latch comprise a 3-2 AOI gate 11002 providing the $\overline{\text{ALOUT}}$ signal and an Inverter 11003 providing the ALOUT signal. The AOI gate 11002 has one AND gate receiving IAREQ, IAAL, and IAR and the other AND gate receiving an AL write control signal provided by the Control Unit and $\overline{\text{IAREQ}}$. During normal operation, ALOUT goes to a "1" to enable the Tri-state Inverter 11001 when AL goes to a "1". During the IA function, ALOUT goes to a "1" when IAAL and IAR are both at "1" levels.

Figure 13:
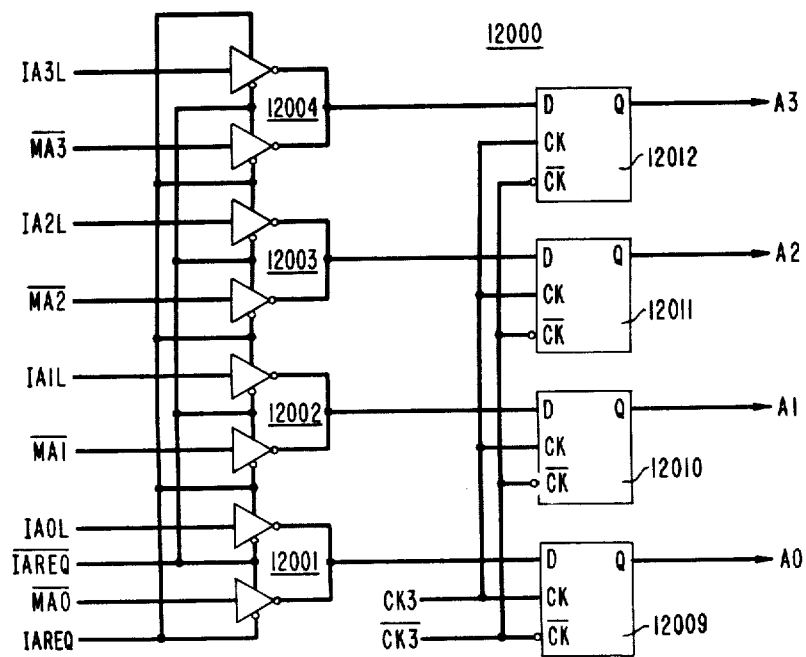
FIG. 13 is a logic diagram of a preferred embodiment of the IA User Register Address Multiplexers.

Referring now to FIG. 13, there is shown a logic diagram of a preferred embodiment of the User Register Address Multiplexer 12000. The multiplexer comprises four pairs of Tri-state Inverters 12001 to 12004. Each pair has one Tri-state Inverter receiving a respective bit of a User Register Address MA0 to MA3 from the Instruction Buffer the other Tri-state Inverter receiving a respective one of the least significant four bits of the current IA Address from the IA A-BUS Address Latch. The outputs of the Tri-state Inverters in each pair are both coupled to the input of a respective one of four D-type flip-flops 12009 to 12012. The Tri-state Inverters in each pair are controlled by IAREQ and $\overline{\text{IAREQ}}$ in a manner such that during normal operation, the Inverter receiving the IA Address bit is disabled and the one receiving the User Register Address bit is enabled to provide its output to the respective flip-flop. But during the IA function, the Inverter receiving the User Register Address bit is disabled and the one receiving the IA Address bit is enabled to provide its output to the respective flip-flop.

Figure 14:
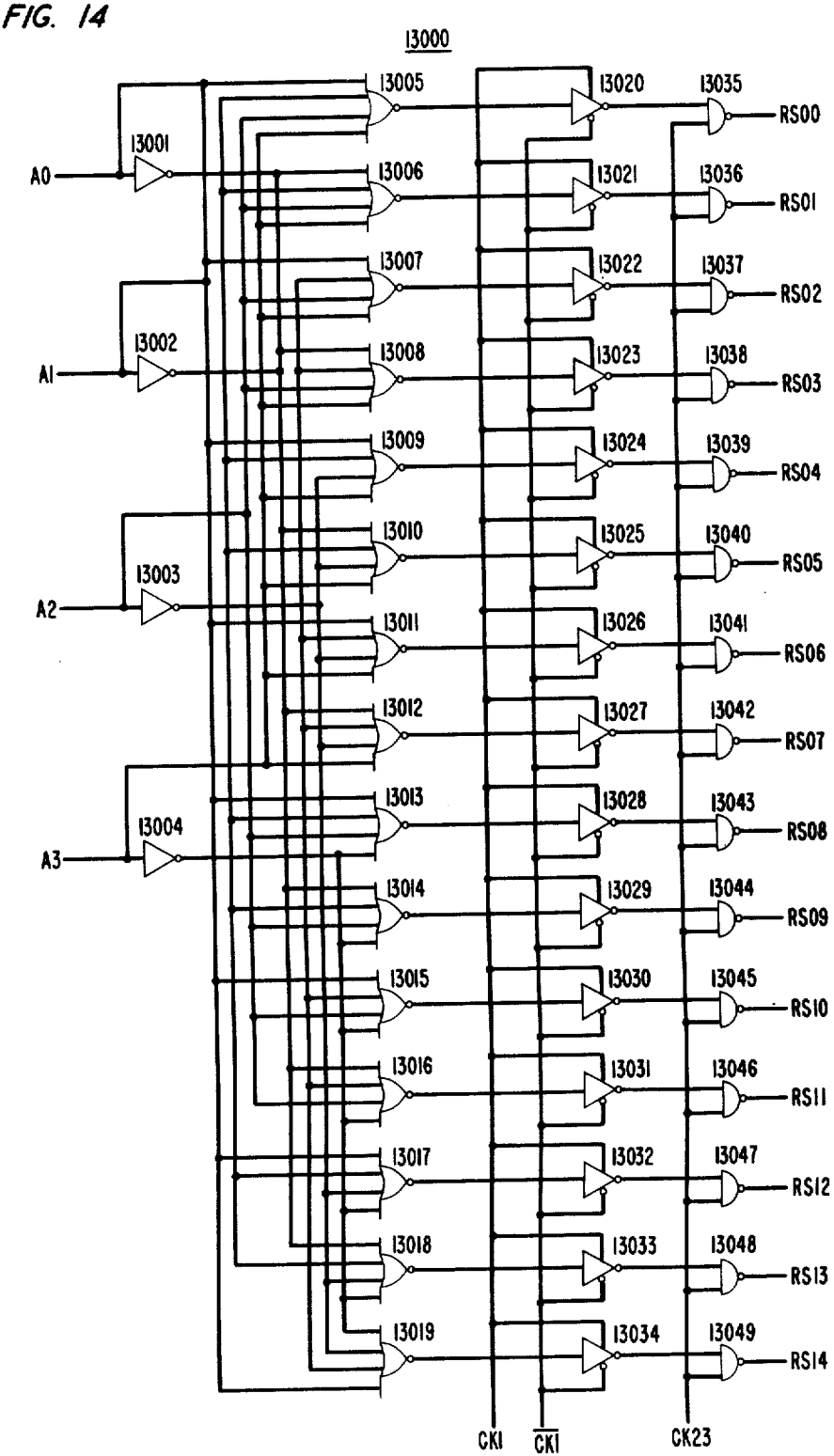
FIG. 14 is a logic diagram of the User Register Array Address Decoder.

Referring now to FIG. 14 there is shown a logic diagram of a preferred embodiment of the User Register Decoder 13000. The Decoder comprises Inverters 13001 to 13004, 4-input NOR gates 13005 to 13019, Tri-state Inverters 13020 to 13034, and 2-input NAND gates 13035 to 13049. The Inverters respectively receive address bits A0 to A3 and provide the complements of the address bits. The NOR gates each receive different combinations of the address bits and their complements. The Tri-state Inverters, which are used as dynamic latches, receive the outputs of respective NOR gates and are controlled by CK1 and $\overline{\text{CK1}}$, the Inverters being enabled when CK1 is a "1". The NAND gates each receive the output of a respective Tri-state Inverter and CK23, the NAND gates providing the register select signals RS00 to RS14.

Figure 15:
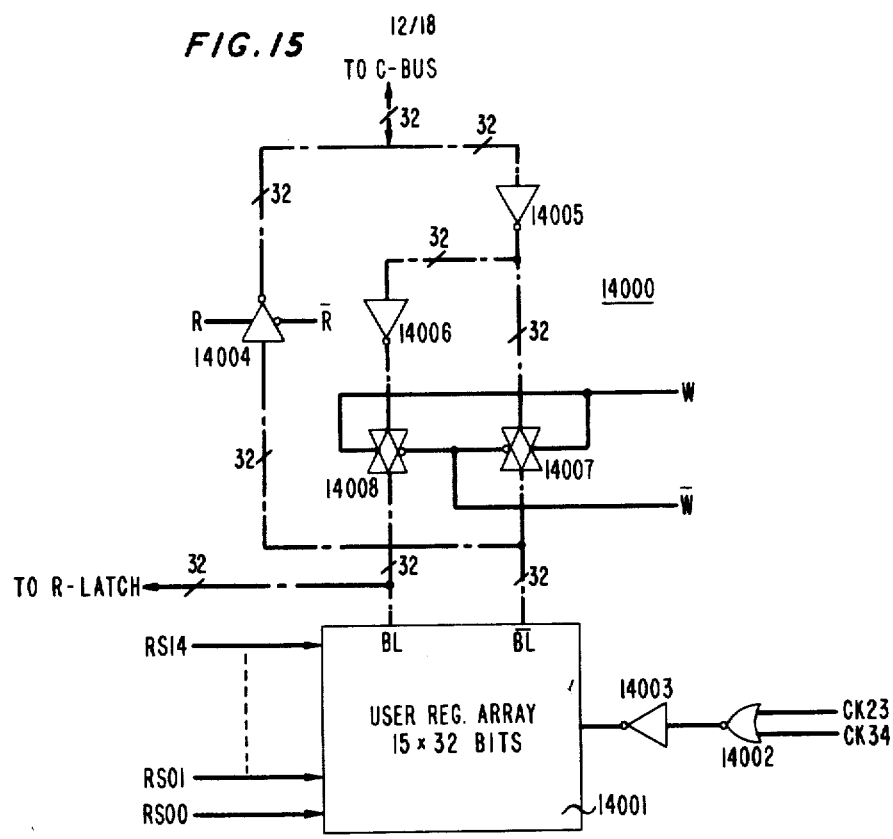
FIG. 15 is a logic diagram of the User Register Array.

Turning now to FIG. 15, there is shown the User Register Array 14000 which includes an array of memory cells 14001 having fifteen rows and thirty-two columns. Each row of memory cells has an associated word line coupled to all cells in that row. The wordlines of the array are coupled to receive respective register select signals RS00 to RS14 from the User Register Decoder. Each row of the array serves as a register, and is selected when a "1" level register select signal is applied to its associated wordline. Data stored in the memory cells of a selected row and the complement of that data are provided at the BL and $\overline{\text{BL}}$ bitlines, respectively. The data in the memory cells of the selected row may be overwritten with new data received at the BL and BL bitlines. Timing signals for the array are derived from CK23 and CK34 by a NOR gate 14002 and an inverter 14003. The array may be read during φ2 to 100 4 and may be written during φ2 and φ3. Data from the array is provided to the C-BUS through Tri-state Inverters 14004 which are controlled by an R signal and its complement R̄, the Tri-state inverters being enabled when R is a "1". Data from the array is also provided directly to the R-Latch. The array receives data to be written into a selected row from the C-BUS through Inverters 14005 and 14006 and Transmission Gates 14007 and 14008, the latter being controlled by a W signal and its complement W̄. The Transmission Gates go to their conducting states when W is a "1".

Figure 16:
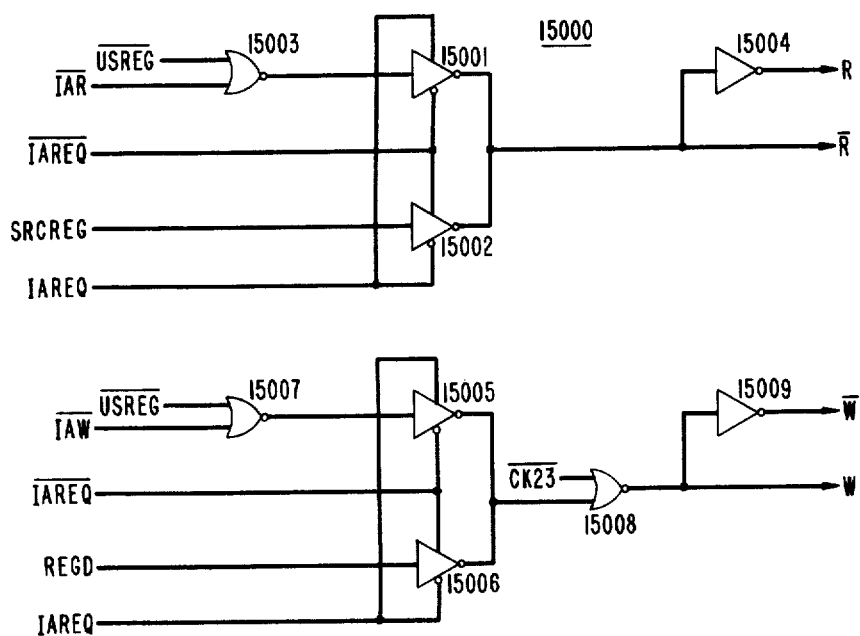
FIG. 16 is a logic diagram of a preferred embodiment of the User Register Array Control Multiplexers.

Referring now to FIG. 16, there is shown a preferred embodiment of the User Register Control Multiplexers 15000. The Multiplexers include a read control section having a first pair of Tri-state Inverters 15001 and 15002 controlled by IAREQ and ĪAREQ and having their outputs tied in common to provide the R signal. One of the pair 15001 receives the output of a NOR gate 15003 which receives ĪAR and ŪSREG while the other of the pair 15002 receives a SRCREG read control signal provided by the Control Unit. During normal operation, the Inverter 15001 is disabled while Inverter 15002 is enabled, and R goes to a "1" when SRCREG goes to a "0". However, during the IA function, Inverter 15001 is enabled while Tri-state inverter 15002 is disabled, and R goes to a "1" when ĪAR and ŪSREG both at "0" levels. The R signal is derived from the R̄ signal by an Inverter 15004.

The Multiplexers also include a write control section having a second pair of Tri-state Inverters 15005 and 15006 controlled by IAREQ and ĪAREQ and having their outputs tied in common, the common output being received together with CK23 by a NOR gate 15008 which provides the W signal. The W̄ signal is derived from the W signal by an inverter 15009. One of the pair of Tri-state Inverters 15005 receives the output of a NOR gate 15007 while the other of the pair 15006 receives a REGD write control signal provided by the Control Unit. The NOR gate 15007 receives IAW and ŪSREG. During normal operation, Inverter 15006 is enabled while Inverter 15005 is disabled, and W goes to a "1" when REGD and CK23 are both at "0" levels. However, during the IA function, Inverter 15005 is enabled while Inverter 15006 is disabled, and W goes to a "1" signal when ĪAW, ŪSREG and CK23 are all at "0" levels.

Referring now to FIG. 17, there is shown a logic diagram of preferred embodiments of the IA Control Latch Address Latch 16000 and the Control Latch Decoder 16100. The Control Latch Address Latch includes five D-type flip-flops 16001 to 16005, each one receiving data from a respective one of five conductors ABUS02 to ABUS06 of the A-BUS. The data is clocked into each flip-flop by IAL and ĪAL. The outputs PA0H to PA4H and the inverted outputs PA0L to PA4L of the flip-flops are provided to the Control Latch Decoder which comprises sixteen 2-input NAND gate 16006 to 16021 and nineteen 2-input NOR gates 16022 to 16040. The Decoder provides nineteen control latch selection signals PLA00 to PLA18.

Figure 18:
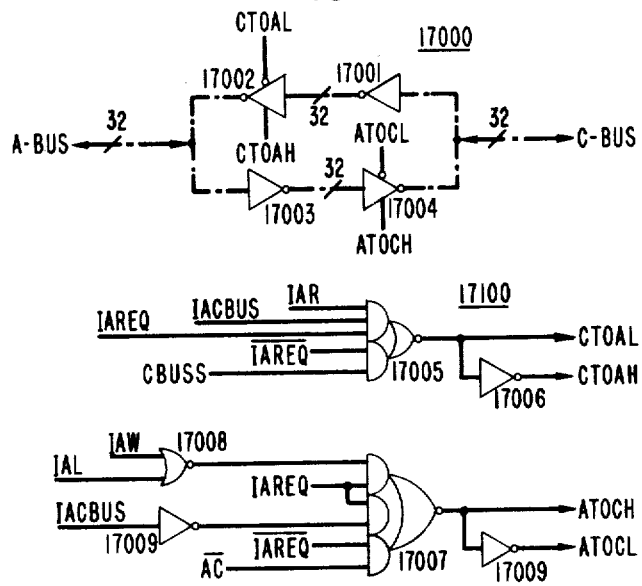
FIG. 18 is a logic diagram of the BUS Multiplexer and a preferred embodiment of the BUS Control Multiplexers.

Referring now to FIG. 18, there is shown a logic diagram of the BUS Multiplexer 17000 and a preferred embodiment of the BUS Control Multiplexers 17100. The Bus Multiplexers include Inverters 17001 and Tri-state Inverters 17002 for transferring data from the C-BUS to the A-BUS. The Tri-state Inverters 17002 are all controlled by a CTOAH signal and its complement CTOAL and are enabled when CTOAH goes to a "1". The BUS Multiplexer also includes Inverters 17003 and Tri-state inverters 17004 for transferring data from the A-BUS to the C-BUS. The Tri-state Inverters 17004 are controlled by an ATOCH signal and its complement ATOCL and are enabled when ATOCH goes to a "1".

The BUS Control Multiplexers include a 3-2 AOI gate 17005 in which one AND gate receives IAR, IACBUS and IAREQ and the other AND gate receives a CBUSS control signal provided by the Control Unit and ĪAREQ. The AOI gate 17005 provides the CTOAL signal from which is derived the CTOAH signal through an inverter 17006. During normal operation, CTOAH goes to a "1" when CBUSS goes to a "1". However, during the IA function, CTOAH goes to a "1" only when both IAR and IACBUS are at "1" levels. The BUS Control Multiplexer also includes a 2-2-2 AOI gate 17007 in which a first AND gate receives IAREQ and the output of a NOR gate 17008, a second AND gate receives IAREQ and the inverted IACBUS signal provided by an inverter 17009, and a third AND gate receiving an ĀC̄ control signal provided by the Control Unit and ĪAREQ. The NOR gate 17008 receives IAW and IAL. The AOI gate 17007 provides the ATOCH signal from which is derived the ATOCL signal by an inverter 17009. During normal operation, ATOCH goes to a "1" when ĀC̄ goes a "0". However, during the IA function, ATOCH goes to a "1" when IACBUS and either of IAW and IAL are at a "1" level.

Figure 19:
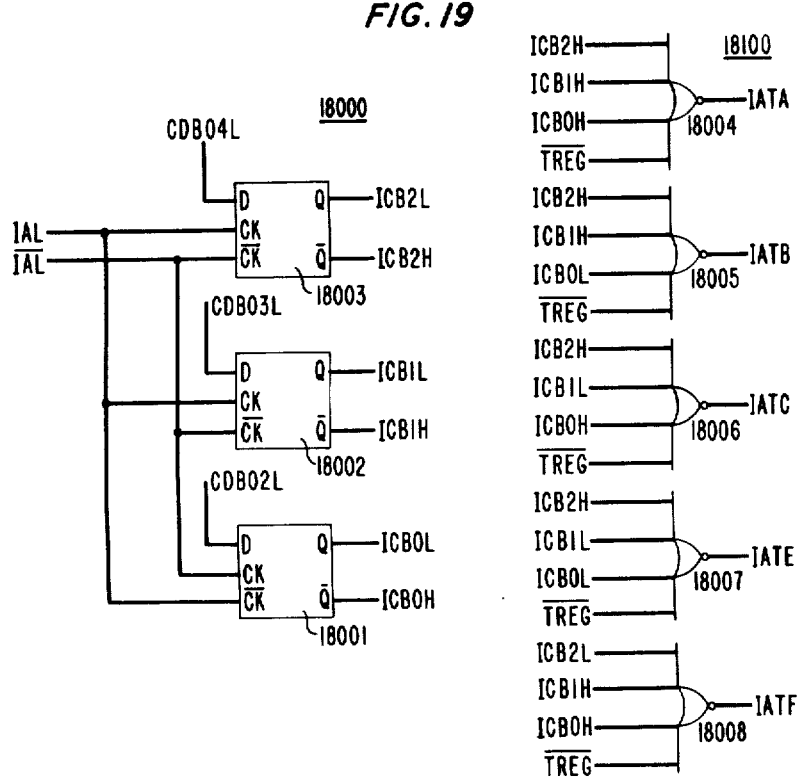
FIG. 19 is a logic diagram of a preferred embodiment of the IA C-BUS Latch and the Temporary C-BUS Register Address Decoder.

Referring now to FIG. 19, there is shown a logic diagram of a preferred embodiment of the IA C-BUS Latch 18000 and the Temporary C-BUS Register Decoder 18100. The IA C-BUS Latch comprises three D-type flip-flops 18001 to 18003 which receive data from respective conductors C-BUS02 to C-BUS04 of the C-BUS. The flip-flops are clocked by IAL and ĪAL. The outputs ICB0L to ICB2L and the inverted outputs ICB0H to ICB2H of the flip-flops are provided to the Temporary C-BUS Register Decoder which comprises five 4-input NOR gates 18004 to 18008. The NOR gates 18004 to 18008, respectively, provide IATA, IATB, IATC, IATE, and IATF selection signals corresponding to the TA, TB, TC, TE, and TF Temporary C-BUS Registers, respectively. Each of the NOR gates 18004 to 18008 receives a different combination of the outputs and inverted outputs of the flip-flops and the TREG signal.

Turning now to FIG. 20, there is shown a logic diagram of a representative Temporary C-BUS Register (TA) 19000 and a preferred embodiment of its associated Control Multiplexers 19100. The TA register receives data from the C-BUS, provides data directly to the ALU and provides data to the C-BUS through a Tri-state Inverter 19001 controlled by a TAOUTH signal and its complement TAOUTL. The Tri-state Inverter is enabled when TAOUTH goes to a "1". Data is clocked into TA by a TACKLH signal and its complement TACKL.

The Associated Control Multiplexers include a 3-4 AOI gate in which one AND gate receives ĪAREQ, CK23 and a LTAH write control signal provided by the Control Unit and the other AND gate receives CK23, IAW, IATA, and IAREQ. The AOI gate 19002 provides the TACLKL signal from which the TACLKH signal is derived by an Inverter 19003. During normal operation, the TACLKH goes to a "1" whenever LTAH and CK23 are both at "1" levels. However, during the IA function, TACLKH goes to a "1" only when IAW, IATA, and CK23 are all at "1" levels. The Associated Control Multiplexers further include a 2-3 AOI gate 19004 in which one AND gate receives IAREQ and a LTAOUTH read control signal provided by the Control Unit and the other AND gate receives IATA, IAR, and IAREQ. The AOI gate 19004 provides the TAOUTL signal from which the TAOUTH signal is derived by an Inverter 19005. During normal operation, the TAOUTH signal goes to a "1" whenever LTAOUTH signal goes to a "1". However, during the IA function, TAOUTH goes to a "1" when IAR and IATA are both at "1" levels.

Referring now to FIG. 21, the I/O Buffer 20000 includes an input latch comprising thirty-two D-type flip-flops 20001 coupled to receive data from the I/O terminals 1001, the data being clocked into the flip-flops by a STIN signal and its complement $\overline{STIN}$. The contents of the input latch are transferred to the A-BUS through Tri-state Inverters 20002 controlled by a SIN signal and its complement $\overline{SIN}$, the Tri-state inverters being enabled when SIN is a "1". The I/O Buffer also includes an output latch comprising thirty-two D-type flip-flops 20003 coupled to receive data from the A-BUS, the data being clocked into the flip-flops by a LM signal and its complement LM. The contents of the output latch are transferred to the I/O terminals through Tri-state Inverters 20004 controlled by a ST0 signal and its complement $\overline{ST0}$, the Tri-state inverters 20004 being enabled when the ST0 signal is a "1".

Turning now to FIG. 22, there is shown a logic diagram of a preferred embodiment of the I/O Buffer Control Multiplexers 21000, 21100, 21200, and a circuit for providing the ST0 and ST0 signals 21300. The Multiplexer 21000 includes a 2-1-2 AOI gate 21001 in which a first AND gate receives IASTIN and IAREQ, a second AND gate receives a WAITH signal derived from an externally provided WAIT signal, and a third AND gate receives a STIL control signal provided by the Control Unit and $\overline{IAREQ}$. The output of the AOI gate 21001 is received by a NOR gate 21002 which also receives the CK34 signals. The NOR gate 21002 provides the STIN signal from which is derived the $\overline{STIN}$ signal by an Inverter 21003. During normal operation, the STIN signal goes to a "1" whenever STIL is a "1" and CK34 is a "0". But during the IA function, STIN goes to a "1" whenever IASTIN is a "1" and CK34 is a "0". In either normal operation or the IA function STIN goes to a "0" whenever the WAITH signal goes to a "1". The WAITH signal and its complement WAITL are derived from an externally applied WAIT signal in the same manner as the RESETH and RESETL signals are derived from the externally provided RESET signal.

The Multiplexer 21100 includes a 2-2 AOI gate 21004 in which one AND gate receives IAREQ and the output of a NOR gate 21012 and the other AND gate receives an $\overline{IRABUS}$ control signal provided the Control Unit and $\overline{IAREQ}$. The NOR gate 21012 receives IAL and IAW. The output of the AOI gate 21004 is received by a Tri-state Inverter 21005 which provides the SIN signal. The Tri-state Inverter 21005, which is used as a dynamic latch, is controlled by CK1 and $\overline{CK1}$ and is enabled when CK1 goes to a "1". The $\overline{SIN}$ signal is derived from SIN by an Inverter 21006. During normal operation, the SIN signal goes to a "1" when $\overline{IRABUS}$ is a "1". However, during the IA function, SIN goes to a "1" when either IAW or IAL is a "1".

The Multiplexer 21200 comprises a 2-2-2 AOI gates 21007 in which a first AND gate receives an $\overline{OR}$ control signal provided by the Control Unit and $\overline{IAREQ}$, a second AND gate receives a DMAWT signal provided by the Control Unit and $\overline{IAREQ}$, and the remaining AND gate receives $\overline{IAR}$ and IAREQ. The output of the AOI gate 21007 is provided to a NAND gate 21010 through an Inverter 21008 and a Tri-state Inverter 21009. The NAND gate which also receives CK3 provides the $\overline{LM}$ signal. The Tri-state Inverter 21009, which is used as a dynamic latch, is controlled by the CK1 and $\overline{CK1}$ and is enabled when CK1 goes to a "1". The LM signal is derived from the $\overline{LM}$ signal by an Inverter 21011. During normal operation, the LM signal goes to a "1" whenever $\overline{OR}$ and DMAWT are both at "0" levels and CK3 is a "1". But during the IA function, the LM signal goes to a "1" whenever $\overline{IAR}$ is a "0" and CK3 is a "1".

The circuit for providing the ST0 and $\overline{ST0}$ signals includes a Wait State Generation Logic circuit 21012 which receives the WAITH and WAITL signals and provides an STP signal to a Tri-state Inverter 21013 controlled by CK1 and $\overline{CK1}$. The Tri-state Inverter 21013, which is used as a dynamic latch, is enabled when CK1 goes to a "1". The circuit further includes a NOR gate 21014 which receives CK23 and the complement of STIL provided by an Inverter 21015. The outputs of the NOR gate 21014 and of the Tri-state Inverter 21013 are received by another NOR gate 21016 which provides the ST0 signal. The $\overline{ST0}$ signal is derived from the ST0 signal by an Inverter 21017. When the processor unit is in a wait state, the Wait State Generation Logic circuit provides a "0" which forces the ST0 signal to a "0". Otherwise, the ST0 signal goes to a "1" whenever STIL is a "0" or whenever CK23 is a "1".

Figure 23:
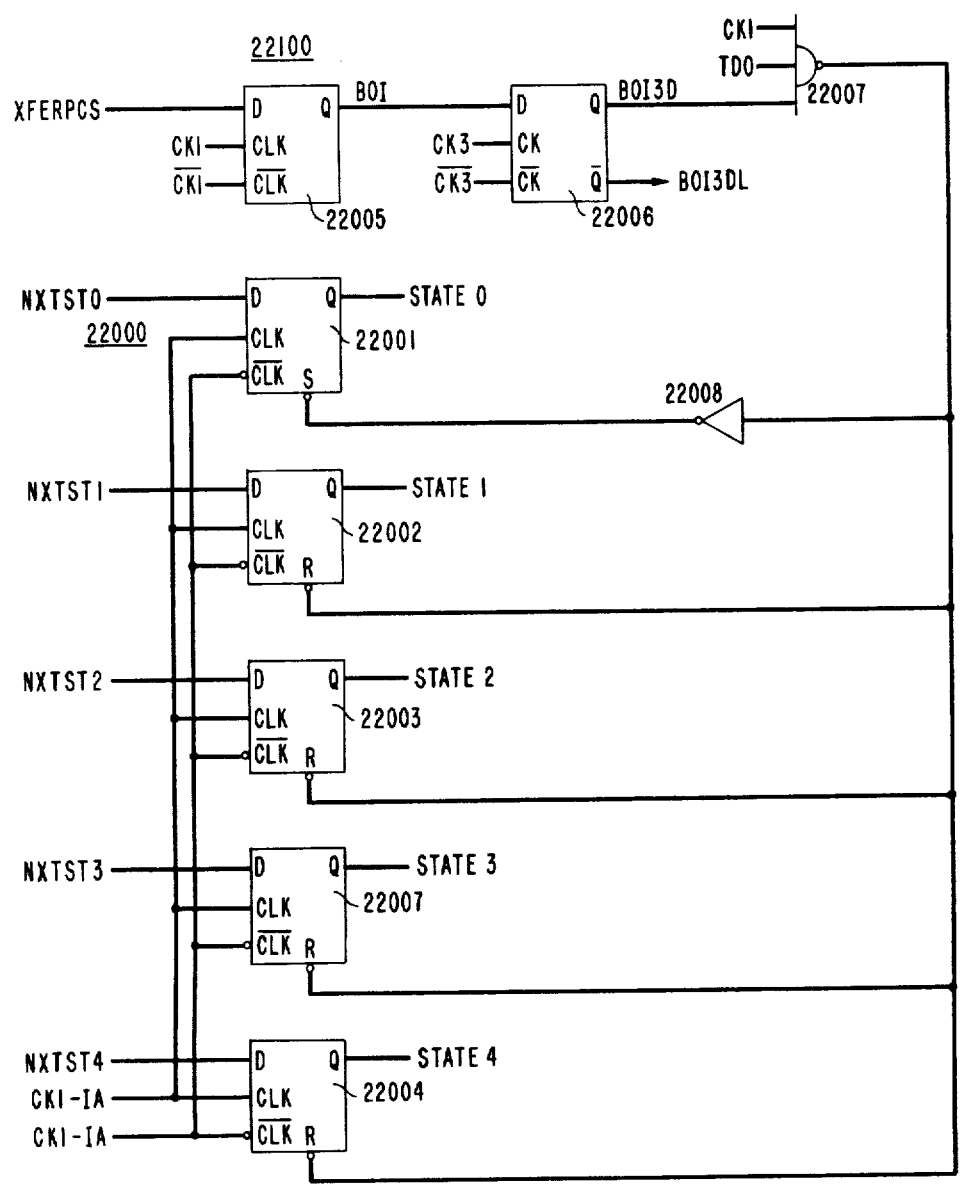
FIG. 23 is a logic diagram of the State Vector Latches and a preferred embodiment of the State Vector Initialization circuit.

Referring now to FIG. 23 there is shown a logic diagram of the least significant five bits of the State Vector Latch 22000 and a preferred embodiment of the State Vector Initialization circuit 22100. The portion of the State Vector Latch shown comprises five D-type flip-flops 22001 to 22004 and 22007 which receive respective feedback signals (next state signals) NXTST0 to NXTST4 from the Control Unit and provide state vector input signals STATE0 to STATE4 to the Control Unit. The feedback signals are clocked into the flip-flops by CK1-IA and $\overline{CK1-IA}$.

The State Vector Initialization Circuit includes a first D-type flip-flop 22005 receiving a XFERPCS control signal and being clocked by CK1 and $\overline{CK1}$. The first flip-flop provides a BOI signal to a second D-type flip-flop 22006 which is clocked by CK3 and $\overline{CK3}$ and which provides an output BOI3D signal to a NAND gate 22007. The NAND gate which also receives TDO and CK1 provides its output to the inverted reset inputs of flip-flops 22002 to 22004 and 22007 and to the set input of flip-flop 22001 through an Inverter 22008. The flip-flop 22006 also provides the BOI3DL signal. When the IA function in the Instruction Mode is enabled, the TDO signal goes to a "1" but the processor unit continues normal operation until after the end of the instruction cycle in which the IA function is enabled. During the last machine cycle of that instruction cycle, the XFERPCS signal goes to a "1" causing the Program Counter to transfer the state of its master section to its slave section in preparation for an instruction fetch.

When the "1" level XFERPCS signal is clocked into flip-flop 22005 by CK1, the BOI signal goes to a "1" signaling the beginning of a new instruction cycle. When the "1" level BOI signal is clocked into flip-flop 22006 by CK3, a "1" level BOI3D and a "0" level $\overline{BOI3DL}$ signal are provided to start the IA function. Thereafter, when CK1 goes to "1" at the beginning of the second machine cycle of the new instruction cycle, the NAND gate 22007 provides a "0" level signal to initialize the least significant five bits of the state vector to the 00001 state.

Figure 24:
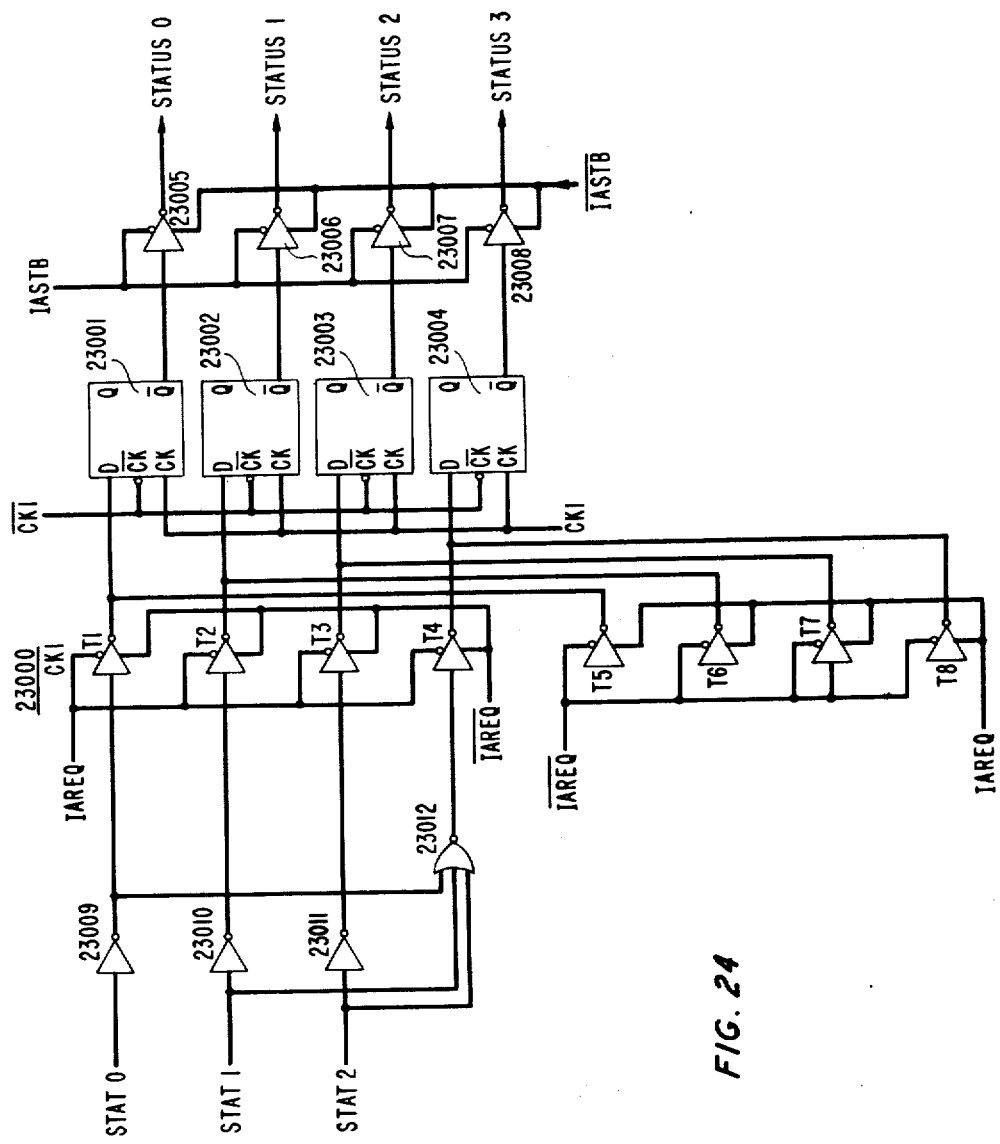
FIG. 24 is a logic diagram of a preferred embodiment of the Status Generation Logic.

Turning now to FIG. 24, there is shown a logic diagram of a preferred embodiment of the Status Generation Logic circuit 23000. The circuit includes a status word latch comprising D-type flip-flops 23001 to 23004 which are clocked by CK1 and $\overline{CK1}$. The contents of the status latch are provided to the STATUS terminals through Tri-state Inverters 23005 to 23008 controlled by IASTB and $\overline{IASTB}$. The Tri-state Inverters 23005 to 23008 are enabled when IASTB is a "0" but are disabled when IASTB is a "1". The circuit also includes Tri-state Inverters T1, T2, T3, and T4 which receive the outputs of Inverters 23009 to 23011 and the output of a NOR gate 23012, respectively. The Inverters 23009 to 23011, respectively, receive status signals STAT0, STAT1 and STAT2 provided by the Control Unit and the NOR gate 23012 receives STAT1, STAT2 and the complement of STAT0 provided by the Inverters 23009. The Tri-state Inverters T1, T2, T3, and T4 are controlled by IAREQ and $\overline{IAREQ}$ to be enabled when IAREQ is a "0" and disabled when IAREQ is a "1". The outputs of T1, T2, T3, and T4 are coupled to the inputs of respective flip-flops of the status word latch. In addition, the circuit includes Tri-state Inverters T5, T6, T7, and T8 having outputs coupled to the inputs of respective flip-flops of the status word latch and being controlled by IAREQ and $\overline{IAREQ}$ to be enabled when IAREQ is a "1" and disabled when IAREQ is a "0". The inputs of T5, T6, and T8 are allowed to float "1" levels while the input of T7 receives $\overline{IAREQ}$. During normal operation when IAREQ is a "0", T5, T6, T7, and T8 are disabled while T1, T2, T3, and T4 are enabled to provide a status code derived from STAT0, STAT1, and STAT2 to the status word latch. At the start of the IA function when IAREQ goes to a "1", T1, T2, T3, and T4 are disabled while T5, T6, T7, and T8 are enabled to provide a 0010 IA acknowledge status code to the inputs of the status word latch. The code is clocked into the status word latch and transferred to the STATUS terminals when CK1 goes to a "1". Thereafter, the Tri-state Inverters 23005 to 23008 are disabled when the IASTB signal goes a "1".

While the invention has been described with reference to a presently preferred embodiment thereof, it will be understood by those skilled in the art that modifications and variations may be made to the described embodiment without departing from the spirit and scope of the present invention. For example, the latches for storing the current IA Address, the decoders for the current IA Address and the Control Multiplexers for the various internal registers may be partitioned differently to suit different bus structure and register arrangements. In some instances it may be desirable to provide access to only a subset of the internal registers of the processor unit. Also, the type of access (i.e., read only, write only, read and write) for individual internal registers may be varied to suit different requirements. Furthermore, other logic implementations may be used for the IA circuitry. In particular, many parts of the IA circuitry such as the IA Control Block, the various Control Multiplexers and the various Register Decoders may be implemented with one or more programmable-logic-arrays (PLAs). Moreover, where PLAs are used in the Control Unit of the microprocessor, it may be desirable to locate a PLA of the IA circuitry adjacent to and contiguous with a PLA of the Control Unit.

What is claimed is:

1. A single-chip processor for executing a program of instructions, the processor comprising:
   means for receiving instructions;
   a plurality of internal registers;
   control means responsive to a current instruction for providing control signals governing the execution of a processor operation specified by the current instruction, including register control signals governing the reading and/or writing of the internal registers;
   characterized in that the internal registers include ones which are assigned test addresses and addressable thereby, and there are included:
   means for receiving a test command signal;
   means responsive to the test command signal for providing a test enable signal;
   means responsive to the test enable signal for suspending the execution of instructions;
   means for receiving test addresses;
   means for storing a current test address specifying an internal register;
   means for receiving test control codes specifying reading or writing of the specified internal register;
   means for storing a current test control code;
   test control means responsive to the current test control code for providing test control signals governing the reading or writing of the specified internal register;
   test address decoding means responsive to the current test address for providing a selection signal corresponding to the specified internal register;
   control signal multiplexer means receiving the register control signals and the test control signals and responsive to the selection signal and to the test enable signal for providing appropriate ones of the test control signals to the specified internal register;
   means for receiving data to be stored in the specified internal register when writing is specified by the current test control code; and
   means for providing data stored in the specified internal register when reading is specified by the current test control code.

2. A single-chip processor as recited in claim 1 wherein the processor further comprises clock means for providing a plurality of clock signals including a first clock signal, means responsive to the first clock signal for storing input signals for the control means including the current instruction, and means for storing the control signals provided by the control means and responsive to the first clock signal for providing the stored control signals, and further characterized in that the means for suspending the execution of instructions include means responsive to the test enable signal for holding the first clock signal at a fixed level.

3. A single-chip processor as recited in claim 2 wherein the instructions are executed one at a time in a series of instruction cycles and further characterized in that the means for providing the test enable signal includes means for detecting the test command signal at regular intervals during each instruction cycle and bistable means having a first and a second state, the test enable signal being provided after a fixed delay following the detection of the test command signal if the bistable means is in the first state but the test enable signal being provided during a fixed interval in the instruction cycle following the one in which the test command signal is detected if the bistable means is in the second state.

4. A single-chip processor as recited in claim 3 wherein the means for storing the control signals comprise one or more control latches and further characterized in that the internal registers which are assigned test addresses include the control latches, registers which are directly accessible by instructions and registers which are not directly accessible by instructions.

5. A single-chip processor as recited in claim 4 further characterized in that the bistable means comprise a flip-flop and the internal registers which are assigned test addresses include the flip-flop.

6. A single-chip processor as recited in claim 5 further comprising a first bus, a second bus, data transfer means responsive to appropriate control signals for controllably transferring data between the first and second buses and wherein the control means providing bus control signals for governing the transfer of data between the first and second buses, a first group of the internal registers being coupled to receive data from and/or to provide data to the first bus and a second group of the internal registers being coupled to receive data from and/or to provide data to the second bus, further characterized in that the second bus is coupled to input/output means serving as the means for receiving test addresses, the means for receiving data and the means for providing data, the test address decoding means being responsive to a test address specifying one of the internal registers of the first group for providing a group selection signal and there are included bus control multiplexer means receiving the bus control signals and responsive to the test enable signal, the group selection signal and the test control signals for providing appropriate control signals derived from the test control signals to the data transfer means, the bus control multiplexer means otherwise for providing the bus control signals to the data transfer means.

7. A single-chip processor as recited in claim 6 further comprising a third bus and further characterized in that the control latches are coupled to provide the control signals stored therein to the third bus and there are included means responsive to a test address specifying one of the control latches and an appropriate test control signal governing the reading of the specified internal register for transferring the control signals on the third bus to the second bus.

8. A single-chip processor as recited in claim 7 wherein the input/output means including a multiplicity of input/output terminals and bidirectional input/output buffers being responsive to appropriate control signals for transferring data and test addresses between the input/output terminals and the second bus and the control means providing buffer control signals governing the operation of the input/output buffers, further characterized in that there are included buffer control multiplexer means receiving the buffer control signals and responsive to the test enable signal and the test control signals for providing appropriate control signals derived from the test control signals to the input/output buffers, the buffer control multiplexer otherwise providing the buffer control signals to the input/output buffers.

9. A microprocessor including:
(a) internal storage registers which store normal data to be processed during normal operation of the microprocessor; and
(b) multiplexer means for enabling test operation of the microprocessor in response to test operation signals which suspend the normal operation and which select and enable access to a selected one of the registers specified by the test operation signals in order to read the normal data from, or to write test data into, the selected one of the registers.

10. A processor comprising:
(a) input/output terminals for receiving instructions for normal operation of the processor;
(b) a plurality of internal registers for storing data for normal operation of the processor;
(c) input/output buffers for forwarding the instructions, for normal operation of the processor and for receiving and forwarding test addresses of a specified one of the internal registers during a test operation;
(d) status terminals for delivering output status information from the processor;
(e) a control circuit responsive to a present instruction for the normal operation, for providing normal control signals governing the execution of the normal operation of the processor specified by the present instruction, said control signals including register control signals governing the reading and writing of the internal registers;
(f) a first circuit for receiving a test command signal from an external source and for generating a test enable signal (e.g., IAREQ) to enable the processor to execute the test operation;
(g) a timing generator responsive to the test enable signal for suspending the execution of the normal operation;
(h) a decoder responsive to the present test address for providing during the test operation a selection signal corresponding to the specified internal register, the status terminals being connected for receiving test control codes;
(i) a control block responsive to the test control codes for generating test control signals;
(j) a second circuit connected so as to receive the register control signals during the normal operation and the test control signals during the test operation and responsive both to the selection signal and to the test enable signal, in order to provide appropriate ones of the test control signals to the specified one of the internal registers during the test operation and to provide the register control signals to the specified one of the internal registers during the normal operation;
whereby during the test operation the input/output buffer receives data from the input/output terminals, which data are to be stored in the specified internal register when writing is specified by the present test control code, but delivers data to the input/output terminals from the specified internal register when reading is specified by the present test control code.

* * * * *